(12) United States Patent
Godwin et al.

(10) Patent No.: US 7,778,600 B2
(45) Date of Patent: *Aug. 17, 2010

(54) APPARATUS AND METHOD TO PROVIDE MULTIPLE WIRELESS COMMUNICATION PATHS TO AND FROM REMOTELY LOCATED EQUIPMENT

(75) Inventors: Bryan W. Godwin, Round Rock, TX (US); James M. Canter, Austin, TX (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 801 days.

This patent is subject to a terminal disclaimer.

(21) Appl. No.: 11/539,331

(22) Filed: Oct. 6, 2006

(65) Prior Publication Data

US 2007/0072548 A1 Mar. 29, 2007

Related U.S. Application Data

(63) Continuation-in-part of application No. 11/279,174, filed on Apr. 10, 2006, which is a continuation of application No. 09/895,647, filed on Jun. 29, 2001, now Pat. No. 7,164,884.

(51) Int. Cl.
*H04B 5/00* (2006.01)

(52) U.S. Cl. ............... 455/41.1; 455/526; 455/73; 455/41.2; 455/552.1; 455/414.1; 701/200; 701/213; 340/825.36; 340/825.49

(58) Field of Classification Search ............... 455/73, 455/41.1, 41.2, 552.1, 526, 414.1; 701/200, 701/213
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A | 10/1983 | Sedam et al. | 364/479 |
| 4,454,670 A | 6/1984 | Bachmann et al. | 40/584 |
| 4,553,211 A | 11/1985 | Kawasaki et al. | 364/479 |
| 4,611,205 A | 9/1986 | Eglise | 340/825.35 |
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |
| 4,926,996 A | 5/1990 | Eglise et al. | 194/212 |
| 4,954,697 A | 9/1990 | Kokubun et al. | 235/381 |
| 5,029,098 A | 7/1991 | Levasseur | 364/479 |

(Continued)

FOREIGN PATENT DOCUMENTS

DE 41 40 450 A1 6/1993

(Continued)

OTHER PUBLICATIONS

NAMA White Paper: Cashless Vending, The National Automatic Merchandising Association (34 pages), 2004.

(Continued)

*Primary Examiner*—Marceau Milord

(57) ABSTRACT

A controller may be provided to monitor and record various activities associated with remotely located equipment, e.g. a vending machine or a service vehicle. The controller may also be operable to communicate over multiple wireless communication paths with remotely located equipment, handheld devices and/or a network operations center over multiple wireless networks.

53 Claims, 9 Drawing Sheets

U.S. PATENT DOCUMENTS

| | | | |
|---|---|---|---|
| 5,077,582 A | 12/1991 | Kravette et al. | 355/206 |
| 5,090,589 A | 2/1992 | Brandes et al. | 221/2 |
| 5,091,713 A | 2/1992 | Horne et al. | 340/541 |
| 5,117,407 A | 5/1992 | Vogel | 369/30 |
| 5,184,179 A | 2/1993 | Tarr et al. | 355/206 |
| 5,207,784 A | 5/1993 | Schwartzendruber | 221/6 |
| 5,239,480 A | 8/1993 | Huegel | 364/479 |
| 5,255,819 A | 10/1993 | Peckels | 222/1 |
| 5,282,127 A | 1/1994 | Mii | 64/479 |
| 5,323,155 A | 6/1994 | Iyer et al. | 341/51 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A | 7/1997 | Andrews | 370/334 |
| 5,671,362 A | 9/1997 | Cowe et al. | 395/228 |
| 5,701,252 A | 12/1997 | Facchin et al. | 364/479 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,794,144 A | 8/1998 | Comer et al. | 455/426 |
| 5,805,997 A | 9/1998 | Farris | 455/466 |
| 5,815,652 A | 9/1998 | Ote et al. | 395/183.07 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | 380/23 |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | 364/559 |
| 5,867,688 A | 2/1999 | Simmon et al. | 395/500 |
| 5,892,758 A | 4/1999 | Argyoudis | 370/335 |
| 5,898,904 A | 4/1999 | Wang | 455/31.3 |
| 5,905,442 A | 5/1999 | Mosebrook et al. | 340/3.7 |
| 5,905,882 A | 5/1999 | Sakagami et al. | 700/86 |
| 5,907,491 A | 5/1999 | Canada et al. | 364/468.15 |
| 5,909,183 A | 6/1999 | Borgstahl et al. | 340/825.22 |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | 370/389 |
| 5,950,630 A | 9/1999 | Portwood et al. | 128/897 |
| 5,956,487 A | 9/1999 | Venkatraman et al. | 709/218 |
| 5,957,262 A | 9/1999 | Molbak et al. | 194/200 |
| 5,959,536 A | 9/1999 | Chambers et al. | 710/104 |
| 5,959,869 A | 9/1999 | Miller et al. | 364/479.1 |
| 5,979,757 A | 11/1999 | Tracy et al. | 235/383 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | 709/206 |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | 455/403 |
| 6,021,437 A | 2/2000 | Chen et al. | 709/224 |
| 6,029,143 A | 2/2000 | Mosher et al. | 705/28 |
| 6,032,202 A | 2/2000 | Lea et al. | 710/8 |
| 6,038,491 A | 3/2000 | McGarry et al. | 700/231 |
| 6,052,667 A | 4/2000 | Walker et al. | 705/15 |
| 6,052,750 A | 4/2000 | Lea | 710/72 |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A | 5/2000 | Myers et al. | 292/201 |
| 6,070,070 A | 5/2000 | Ladue | 455/419 |
| 6,072,521 A | 6/2000 | Harrison et al. | 348/12 |
| 6,084,528 A | 7/2000 | Beach et al. | 340/825.35 |
| 6,085,888 A | 7/2000 | Tedesco et al. | 194/217 |
| 6,109,524 A | 8/2000 | Kanoh et al. | 235/381 |
| 6,119,053 A | 9/2000 | Taylor et al. | 700/231 |
| 6,119,100 A | 9/2000 | Walker et al. | 705/20 |
| 6,124,800 A | 9/2000 | Beard et al. | 340/825.35 |
| 6,131,399 A | 10/2000 | Hall | 62/127 |
| 6,161,059 A | 12/2000 | Tedesco et al. | 700/232 |
| 6,163,811 A | 12/2000 | Porter | 709/247 |
| 6,181,981 B1 | 1/2001 | Varga et al. | 700/236 |
| 6,185,545 B1 | 2/2001 | Resnick et al. | 705/40 |
| 6,199,753 B1 | 3/2001 | Tracy et al. | 235/375 |
| 6,230,150 B1 | 5/2001 | Walker et al. | 705/400 |
| 6,272,395 B1 | 8/2001 | Brodbeck | 700/236 |
| 6,289,453 B1 | 9/2001 | Walker et al. | 713/175 |
| 6,304,895 B1 | 10/2001 | Schneider et al. | 709/203 |
| 6,317,649 B1 | 11/2001 | Tedesco et al. | 700/232 |
| 6,324,520 B1 | 11/2001 | Walker et al. | 705/16 |
| 6,338,149 B1 | 1/2002 | Ciccone, Jr. et al. | 714/38 |
| 6,339,731 B1 | 1/2002 | Morris et al. | 700/236 |
| 6,341,271 B1 | 1/2002 | Salvo et al. | 705/28 |
| 6,356,794 B1 | 3/2002 | Perin, Jr. et al. | 700/78 |
| 6,385,772 B1 | 5/2002 | Courtney | 725/105 |
| 6,427,912 B1 | 8/2002 | Levasseur | 235/381 |
| 6,434,534 B1 | 8/2002 | Walker et al. | 705/14 |
| 6,437,692 B1 | 8/2002 | Petite et al. | 340/540 |
| 6,442,532 B1 | 8/2002 | Kawan | 705/35 |
| 6,457,038 B1 * | 9/2002 | Defosse | 709/200 |
| 6,462,644 B1 | 10/2002 | Howell et al. | 340/5.92 |
| 6,467,685 B1 | 10/2002 | Teicher | 235/379 |
| 6,502,131 B1 | 12/2002 | Vaid et al. | 709/224 |
| 6,505,095 B1 | 1/2003 | Kolls | 700/244 |
| 6,525,644 B1 | 2/2003 | Stillwagon | 340/5.61 |
| 6,550,672 B1 | 4/2003 | Tracy et al. | 235/383 |
| 6,553,336 B1 | 4/2003 | Johnson et al. | 702/188 |
| 6,581,986 B2 | 6/2003 | Roatis et al. | 292/199 |
| 6,584,309 B1 | 6/2003 | Whigham | 455/414 |
| 6,585,622 B1 | 7/2003 | Shum et al. | 482/8 |
| 6,604,086 B1 | 8/2003 | Kolls | 705/14 |
| 6,604,087 B1 | 8/2003 | Kolls | 705/14 |
| 6,606,602 B1 | 8/2003 | Kolls | 705/14 |
| 6,606,605 B1 | 8/2003 | Kolls | |
| 6,609,113 B1 | 8/2003 | O'Leary et al. | 705/39 |
| 6,615,623 B1 | 9/2003 | Ormerod | 70/224 |
| 6,628,764 B1 * | 9/2003 | Petite | 379/106.01 |
| 6,695,166 B2 | 2/2004 | Long | 221/14 |
| 6,704,714 B1 | 3/2004 | O'Leary et al. | 705/39 |
| 6,705,520 B1 * | 3/2004 | Pitroda et al. | 235/382.5 |
| 6,712,266 B2 | 3/2004 | Bartley et al. | 235/380 |
| 6,714,977 B1 | 3/2004 | Fowler et al. | 709/224 |
| 6,735,630 B1 | 5/2004 | Gelvin et al. | 709/224 |
| 6,738,811 B1 | 5/2004 | Liang | 709/224 |
| 6,748,296 B2 | 6/2004 | Banerjee et al. | 700/241 |
| 6,751,562 B1 | 6/2004 | Blackett et al. | 702/61 |
| 6,754,558 B2 | 6/2004 | Preston et al. | 700/236 |
| 6,772,048 B1 | 8/2004 | Leibu et al. | 700/241 |
| 6,826,607 B1 | 11/2004 | Gelvin et al. | 709/224 |
| 6,832,251 B1 | 12/2004 | Gelvin et al. | 709/224 |
| 6,837,436 B2 | 1/2005 | Swartz et al. | 235/472.02 |
| 6,844,813 B2 | 1/2005 | Hardman | 340/539.1 |
| 6,850,252 B1 | 2/2005 | Hoffberg | 345/716 |
| 6,859,831 B1 | 2/2005 | Gelvin et al. | 709/224 |
| 6,867,685 B1 | 3/2005 | Stillwagon | 340/5.64 |

| | | | |
|---|---|---|---|
| 6,876,988 B2 | 4/2005 | Helsper et al. | 706/21 |
| 6,900,720 B2 | 5/2005 | Denison et al. | 340/5.9 |
| 6,925,335 B2 | 8/2005 | May et al. | 700/9 |
| 6,959,265 B1 | 10/2005 | Candela et al. | 702/186 |
| 6,973,475 B2 | 12/2005 | Kenyon et al. | 709/203 |
| 7,010,594 B2 | 3/2006 | Defosse | |
| 7,013,337 B2 | 3/2006 | Defosse et al. | |
| 7,017,085 B2 | 3/2006 | Braun | 714/47 |
| 7,076,329 B1 | 7/2006 | Kolls | 700/232 |
| 7,103,511 B2* | 9/2006 | Petite | 702/188 |
| 7,110,954 B2* | 9/2006 | Yung et al. | 705/1 |
| 7,131,575 B1 | 11/2006 | Kolls | 235/379 |
| 7,164,884 B2* | 1/2007 | Defosse et al. | 455/41.1 |
| 7,181,501 B2* | 2/2007 | Defosse | 709/217 |
| 7,181,517 B1* | 2/2007 | Iavergne et al. | 709/224 |
| 7,185,014 B1* | 2/2007 | Hansen | 707/10 |
| 7,191,034 B2 | 3/2007 | Whitten et al. | 700/244 |
| 7,286,901 B2 | 10/2007 | Whitten et al. | 700/244 |
| 7,397,907 B2* | 7/2008 | Petite | 379/155 |
| 7,489,913 B2 | 2/2009 | Welnick et al. | |
| 7,522,880 B2* | 4/2009 | Stieber et al. | 455/41.2 |
| 2001/0002210 A1 | 5/2001 | Petite | 379/155 |
| 2001/0034566 A1 | 10/2001 | Offer | 700/236 |
| 2001/0042121 A1 | 11/2001 | Defosse et al. | 709/224 |
| 2001/0047410 A1 | 11/2001 | Defosse | 709/224 |
| 2001/0054083 A1 | 12/2001 | Defosse | 709/217 |
| 2002/0016829 A1 | 2/2002 | Defosse | 709/217 |
| 2002/0024420 A1 | 2/2002 | Ayala et al. | 340/5.61 |
| 2002/0032470 A1 | 3/2002 | Linberg | 607/60 |
| 2002/0077724 A1 | 6/2002 | Paulucci et al. | 700/231 |
| 2002/0082665 A1 | 6/2002 | Haller et al. | 607/60 |
| 2002/0107610 A1 | 8/2002 | Kaehler et al. | 700/232 |
| 2002/0123966 A1 | 9/2002 | Chu et al. | |
| 2002/0133581 A1 | 9/2002 | Schwartz et al. | |
| 2002/0169539 A1 | 11/2002 | Menard et al. | 701/200 |
| 2002/0194387 A1 | 12/2002 | Defosse | 709/251 |
| 2003/0003865 A1 | 1/2003 | Defosse et al. | 455/41 |
| 2003/0013482 A1 | 1/2003 | Brankovic | 455/553 |
| 2003/0050841 A1 | 3/2003 | Preston et al. | 705/16 |
| 2003/0061094 A1 | 3/2003 | Banerjee et al. | 705/14 |
| 2003/0074106 A1 | 4/2003 | Butler | 700/236 |
| 2003/0097474 A1 | 5/2003 | Defosse et al. | 709/246 |
| 2003/0101257 A1 | 5/2003 | Godwin | 709/223 |
| 2003/0101262 A1 | 5/2003 | Godwin | 709/224 |
| 2003/0128101 A1 | 7/2003 | Long | 340/5.26 |
| 2003/0204391 A1 | 10/2003 | May et al. | 704/8 |
| 2004/0207509 A1 | 10/2004 | Mlynarczyk et al. | 340/5.23 |
| 2005/0131577 A1 | 6/2005 | Ota et al. | 700/242 |
| 2005/0161953 A1 | 7/2005 | Roatis et al. | 292/199 |
| 2005/0179544 A1 | 8/2005 | Sutton et al. | 340/543 |
| 2007/0096867 A1 | 5/2007 | Denison et al. | 340/5.23 |
| 2007/0100649 A1 | 5/2007 | Walker et al. | |

FOREIGN PATENT DOCUMENTS

| | | |
|---|---|---|
| EP | 0 564 736 A1 | 10/1993 |
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 744 545 | 2/1996 |
| FR | 2 755776 | 5/1998 |
| JP | 04253294 | 9/1992 |
| JP | 6296335 A2 | 10/1994 |
| JP | 9198172 A2 | 7/1997 |
| JP | 10105802 | 4/1998 |
| WO | WO 89/07807 | 8/1989 |
| WO | WO 95/04333 | 2/1995 |
| WO | WO 95/05609 | 2/1995 |
| WO | WO 97/09667 | 3/1997 |
| WO | WO 98/45779 | 10/1998 |
| WO | WO 99/23620 | 5/1999 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | WO 02/19281 | 3/2002 |

OTHER PUBLICATIONS

Skywire Provides Details of Wireless 'VendView' System; Vending Times, Sep. 1994.
Wireless Communications Forum; vol. III, No. 1 pp. 25-30, Apr. 1995.
Left high and dry? Sold-out machine sends for Cokes; Nashville Banner, Aug. 16, 1995.
Leitch, Carolyn, "Coke machines signal when it's time for a refill"; The Globe & Mail, Toronto, Ontario, Aug. 30, 1995.
Meet the Smart Coke Machine; The Sacramento Bee Business Technology; Wednesday, Aug. 30, 1995.
Skywire allows vendor tracking of pop stock and sales details; RCR, vol. 14, No. 17, Sep. 4, 1995.
International Search Report for PCT/US99/05983 7 pages, Aug. 13, 1999.
American Power Conversion Internet Article, "Lightning Advisor", at internet, <http://lightning.apcc.com>, May 10, 2000.
American Products Internet Article, "Product Information", at internet, <http://www.apc.com>, May 10, 2000.
NetBotz Internet Article, "Welcome to Netbotz" at internet <http:www.netbotz.com>, May 10, 2000.
*BT redcare Telemetry Vending Interface Unit (VIU)*, Antronics Ltd Case Study, <http:www.antronic.co.uk/portfolio/viu>, 4 pgs., 2001.
International Search Report PCT/US01/16749, Dec. 20, 2001.
International Search Report PCT/US01/15522, May 16, 2002.
International Search Report PCT US 01/41640, Aug. 21, 2002.
International Search Report PCT/US 01/31381, Nov. 7, 2002.
International Preliminary Examination Report PCT/US01/31381, May 12, 2003.
International Search Report PCT/US 03/37776, May 17, 2004.
What is an iButton?, Maxim/Dallas, http://www.maxim-ic.com/products/ibutton/ibuttons (3 pages), Dec. 29, 2005.
Cashless—Definition from the Merriam-Webster Online Dictionary; 2 pages, printed Sep. 9, 2008.
Office Action dated Dec. 31, 2007 in connection with U.S. Appl. No. 11/279,174.
Office Action dated Dec. 11, 2008 in connection with U.S. Appl. No. 11/279,174.
Office Action dated Oct. 6, 2004 in connection with U.S. Appl. No. 09/895,647.
Office Action dated Jul. 5, 2005 in connection with U.S. Appl. No. 09/895,647.
Office Action dated Jun. 11, 2008 in connection with U.S. Appl. No. 11/279,174.
Office Action dated Apr. 29, 2009 in connection with U.S. Appl. No. 11/279,174.
Office Action dated Aug. 24, 2009 in connection with U.S. Appl. No. 11/279,174.
Office Action dated Feb. 4, 2010 in connection with U.S. Appl. No. 11/279,174.
Office Action dated Mar. 26, 2010 in connection with U.S. Appl. No. 11/772,533.

* cited by examiner

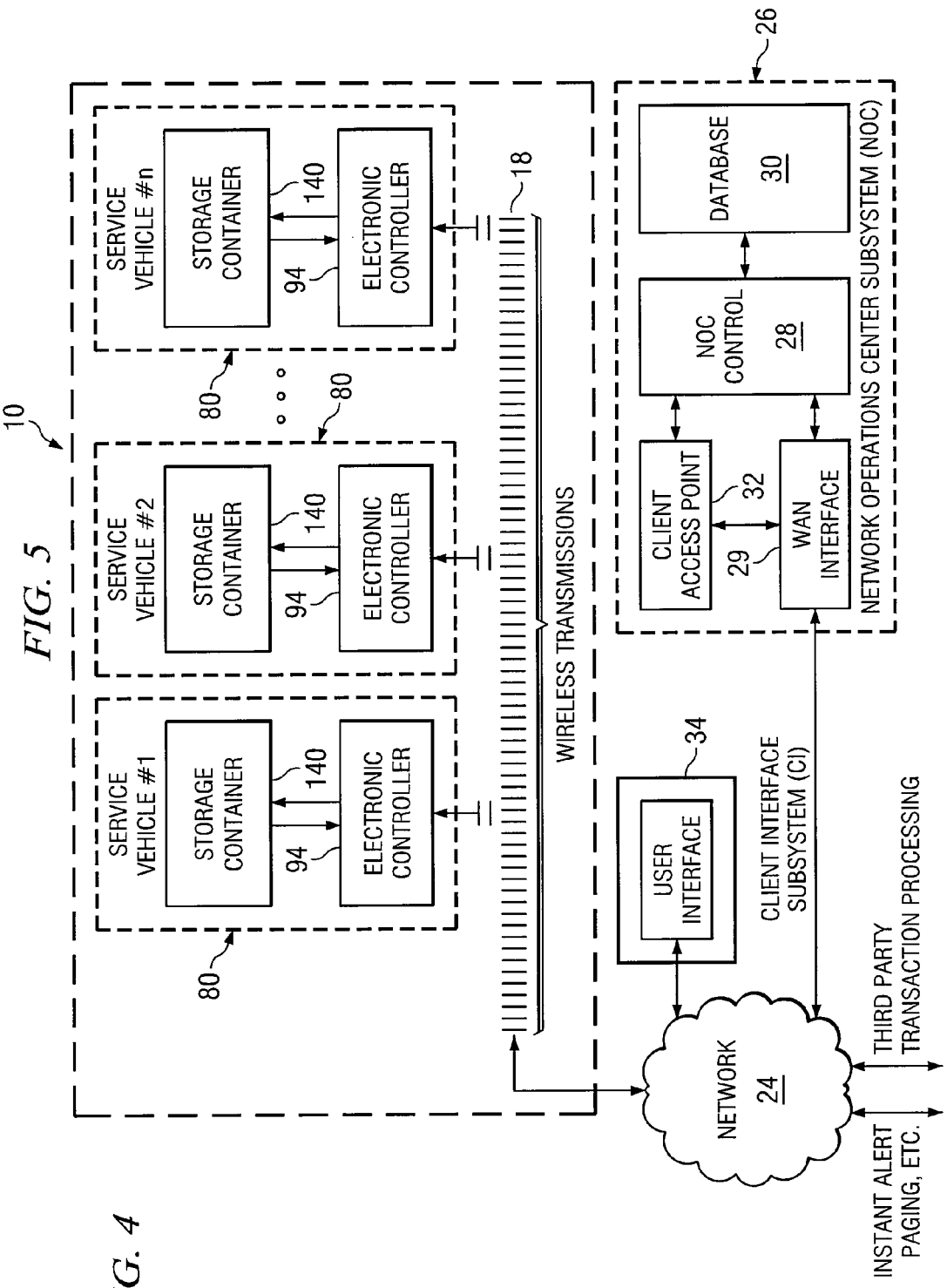
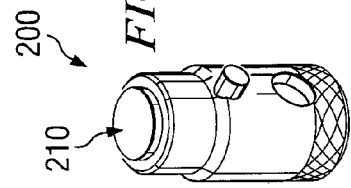

APPARATUS AND METHOD TO PROVIDE MULTIPLE WIRELESS COMMUNICATION PATHS TO AND FROM REMOTELY LOCATED EQUIPMENT

RELATED APPLICATION

This application is a continuation-in-part of U.S. patent application Ser. No. 11/279,174 entitled "Method and System for Interfacing a Machine Controller and a Wireless Network" filed Apr. 10, 2006, which is a continuation application of U.S. patent application Ser. No. 09/895,647 now U.S. Pat. No. 7,164,884 entitled "Method and System for Interfacing a Machine Controller and Wireless Network" filed Jun. 29, 2001.

This application is related to copending Patent Application entitled "Apparatus And Method For Controlling Access To Remotely Located Equipment", application Ser. No. 11/277,272, filed Mar. 23, 2006, claiming priority to U.S. Provisional Patent Application Ser. No. 60/729,106 Filed Oct. 22, 2005, and copending Patent Application entitled "Apparatus And Method For Attaching An Electronic Module To A Lock Assembly" Application Ser. No. 11/674,393, filed Feb. 13, 2007 claiming priority to U.S. Provisional Patent Application Ser. No. 60/772,700 filed Feb. 13, 2006.

TECHNICAL FIELD

Apparatus and methods are provided to allow wireless communication with remotely located equipment, including without limitation, using multiple networks and communication paths. More particularly, apparatus and methods are provided to change changing wireless networks without requiring major hardware changes of communication equipment.

BACKGROUND OF THE INVENTION

Modern, electronic vending machines often contain microprocessor based control systems, sometimes referred to as "vending machine controllers." Such systems may be used to control, monitor and record detailed information about the state of an associated vending machine including, but not limited to, sales, cash received and paid out, errors, events, temperatures, inventory change, lock and unlock. A vending machine controller (VMC) may also control, monitor and record information from peripheral devices associated with functions such as coin acceptance, change giving, displays, credit cards and wireless transactions. The European Vending Association's Data Transfer Standard ("EVA-DTS") and the National Automatic Merchandising Association's (NAMA) Multi-Drop Bus/Internal Communications Protocol (MDB/ICP or MDB) are widely used formats for collecting, recording, transmitting and auditing data associated with vending machines.

Advances in electronics are now enabling the use of computer controls and data acquisition systems within each vending machine. Some of the latest vending machines make it possible for vending operators to download data and information associated with sales, inventory, and equipment status on-site onto portable computers or transmit vending machine data and information to a central location such as a network operations center. Many vending machines include vending machine controllers based on the International Multi-drop Bus Interface Standards developed by the National Automatic Merchandising Association (NAMA).

Advances in electronics have also enabled the use of controls and data acquisition systems in other types of remotely located equipment, e.g. service vehicles, snack machines, beverage machines, automatic teller machines (ATMs), postage stamp dispensers, arcade machines, slot machines, laundry machines and car wash equipment, in addition to vending machines. However, there are many known disadvantages to such control and data acquisition systems in remotely located equipment. For example, known systems may require that, in order to retrieve data from the data acquisition system, remotely located equipment (e.g., a service vehicle) must be returned to a central location or one must travel to the geographical location in which the remotely located equipment is located.

SUMMARY OF THE DISCLOSURE

Therefore, a need has arisen for systems and methods for providing multiple wireless communication paths to and from remotely located equipment. In accordance with teachings of the present disclosure, apparatus and methods may be presented for providing multiple wireless communications paths to and from remotely located equipment.

In one embodiment of the present disclosure, a system for interfacing a controller with a plurality of wireless networks may comprise a wireless antenna, a wireless interface module, and a plurality of wireless transceivers. The wireless antenna is coupled to a wireless interface module operable to send and receive wireless signals. The wireless interface module may be in communication with the controller and have an interface operable to communicate with a plurality of wireless transceivers. The wireless interface module may be further operable to communicate wireless signals between each wireless transceiver and the antenna. Each of the wireless transceivers may be associated with at least one of the plurality of wireless networks, operable to be remotely coupled to the wireless interface module and operable to send and receive wireless signals associated with one or more of the wireless networks.

In another embodiment of the present disclosure a system for monitoring and controlling access to a service vehicle may comprise a service vehicle, a controller, a first wireless transceiver associated with a first wireless network, a second wireless transceiver associated with a second wireless network and not operable to communicate over the first wireless network, a wireless interface module coupled to the service vehicle controller and capable of being used with the first and second wireless transceivers, and a selected wireless transceiver removably coupled to the wireless interface module, wherein the selected wireless transceiver is selected from the first and second wireless transceivers based on available wireless networks in a geographical location in which the system is to be located.

In yet another embodiment of the present disclosure, a system for controlling and monitoring access to a service vehicle and objects disposed within the service vehicle may comprise an electronic enclosure disposed within the service vehicle, a controller disposed within the electronic enclosure, and a mobile storage container. The electronic enclosure may operably be coupled with the mobile storage container. The mobile storage container may have a plurality of receptacles operable to be releasably engaged with respective inserts. Each insert may have a respective unique electronic identifier. Each receptacle may be operable to communicate a signal to the controller when one of the inserts is engaged with the receptacle and when the one insert is removed from the receptacle. The controller may be operable to identify the respective insert disposed in the receptacle.

In accordance with yet another embodiment of the present disclosure a method for interfacing a controller disposed in a service vehicle with a plurality of wireless networks distributed over a geographic area is provided. A wireless interface module having a wireless transceiver port capable of interfacing with a plurality of wireless transceivers may be integrated with the controller. Each wireless transceiver may be associated with at least one of the plurality of wireless networks. The service vehicle may be deployed to a first geographic location. One of the plurality of wireless networks may be determined as preferred for use at the first geographic location. A wireless transceiver associated with the preferred wireless network may be selected from the plurality of wireless transceivers and removably coupled to the wireless transceiver port.

In accordance with yet another embodiment of the present disclosure, a service vehicle operable to communicate with a plurality of wireless networks may comprise a controller, a wireless interface module, and a wireless transceiver. The controller may be operable to monitor, control and record operation of the service vehicle and to monitor and record information associated with selected functions of the service vehicle and may have a bus interface adapted to communicate such information using the wireless interface module. The wireless interface module may be removably coupled into the controller bus interface and may be in electrical communication with the controller to receive the information. The wireless interface module may further include a wireless transceiver port capable of interfacing with a plurality of wireless transceivers respectively associated with one of the plurality of wireless networks. The wireless transceiver may be removably coupled to the wireless transceiver port and be operable to communicate information with the associated wireless network. The wireless transceiver may be selected from a plurality of wireless transceivers based on each geographic location of the service vehicle and increased reliability of communications with the associated wireless network.

In accordance with yet another embodiment of the present disclosure, a system operable to provide more than one wireless communication path may comprise a service vehicle having at least one controller disposed therein, a first wireless transceiver associated with a first wireless network, a second wireless transceiver associated with a second wireless network and not operable to communicate over the first wireless network, a wireless interface module coupled to the controller and capable of being used with the first and second wireless transceivers, a selected wireless transceiver removably coupled to the wireless interface module, and the selected wireless transceiver selected from the first and second wireless transceivers based on available wireless networks in a geographical location in which the service vehicle is to be located.

In accordance with yet another embodiment of the present disclosure, a method for interfacing a controller with a plurality of wireless networks distributed over a geographic area is provided. A wireless interface module may be installed into a standardized connector of the controller and power and data may be supplied to the wireless interface module from the controller. The wireless interface module may prepare the data for transmission across a plurality of wireless networks by the wireless interface module and the controller may be deployed in a service vehicle to a geographic location. One of the plurality of wireless networks is selected for testing as a preferred wireless network for the geographic location, and a wireless transceiver associated with the selected wireless network is selected from a plurality of wireless transceivers respectively associated with the plurality of wireless networks. The selected wireless transceiver is removably coupled to a standardized port associated with the wireless interface module to test the compatibility of the geographic location and the selected wireless network, and additional wireless transceivers are removably coupled with the wireless interface module to determine which transceiver and associated wireless network establishes the best performance at the geographic location.

In accordance with yet another embodiment of the present disclosure, a system operable to provide more than one wireless communication path may include a wireless interface module, one or more wireless transceivers, and a selected wireless transceiver. The wireless interface module may be configured to be coupled to a controller. The one or more wireless transceivers may be removably coupled to the wireless interface module. Each wireless transceiver may be associated with a respective wireless network. The selected wireless transceiver may be removably coupled to the wireless interface module and may be selected from the one or more wireless transceivers based on available wireless networks in a geographical location in which the service vehicle is to be located.

Technical benefits of the present disclosure may include eliminating or substantially reducing requirements for service personnel to return a service vehicle to a central location for replenishment of inventory, tools or consumable products or for service personnel to travel to the geographic location of remotely located equipment to service such equipment. In large metropolitan areas significant amounts of nonproductive time may be saved by no longer requiring service personnel to return service vehicles to a central location at the end of each daily work shift for maintenance and/or servicing or travel to service other remotely located equipment. In addition, by providing multiple wireless communication paths to and from remotely located equipment, one or more alternative wireless communication paths may be provided in the event that one or more of the other wireless communication paths does not provide adequate quality of service.

All, some or none of these technical advantages may be present in various embodiments of the present disclosure. Other technical advantages will be readily apparent to one skilled in the art from studying the following figures, descriptions and/or claims.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 3b is a schematic drawing in elevation showing a back view of the panel in FIG. 3a;

FIG. 4 is an isometric drawing showing an isometric view of one example of an insert incorporating various teachings of the present disclosure;

FIG. 5 illustrates a block diagram of service vehicles interfaced through wireless or wireline networks;

DETAILED DESCRIPTION OF THE DISCLOSURE

Figure 1:
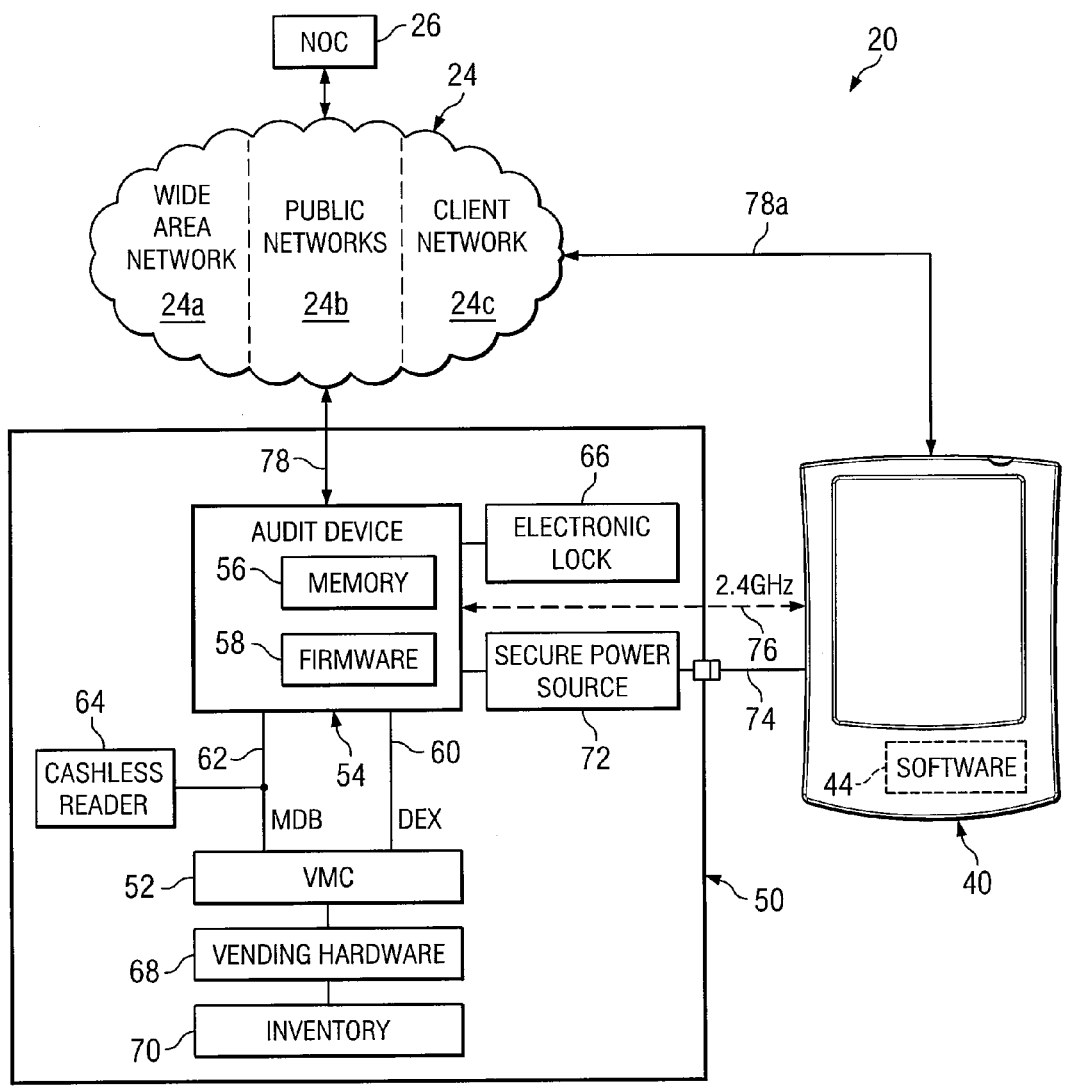
FIG. 1 is a block diagram showing one example of a system for communicating information between remotely located equipment and a network operations center using various communication techniques including a handheld device.

Preferred embodiments of the disclosure and various advantages are best understood by reference to FIGS. 1-9 wherein like numbers refer to same and like parts.

Various aspects of the present disclosure may be described with respect to remotely located equipment, mobile storage containers, mobile electronic controllers and/or handheld devices. However, various features and teachings of the present disclosure may be satisfactorily used with fixed storage containers having valuable objects disposed therein. Also, various embodiments of the present disclosure may not require the use of a handheld device but may instead utilize a personal computer, general purpose computer, or other suitable device.

The term "remotely located equipment" may be used in this application to refer to any automatic sales machine that allows payment to be exchanged for goods or services including, but not limited to, all types of service vehicles, vending machines, snack machines, beverage machines, automatic teller machines (ATMs), postage stamp dispensers, arcade machines, slot machines, laundry machines and car wash equipment. The term "remotely located equipment" may also be used to describe any type of equipment operated by use of a key or any enclosure, building or other secured space which may be opened using a key.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, ethernet cabling (10baseT, 100baseT, etc.), coaxial cables, T-1 lines, T-3 lines, ISDN lines, ADSL, etc.

The term "wireless transmissions" may be used to refer to all types of electromagnetic communications which do not require a wire, cable, or other types of conduits. Examples of wireless transmissions which may be used include, but are not limited to, personal area networks (PAN), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, such as IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

The term "receptacle" may be used in this application to describe a socket, a chamber or any other type of cavity having an opening operable to receive an insert therein. Electrical contacts may be provided in the receptacle to communicate with an electronic controller.

The term "insert" may be used in this application to describe a plug, a fob, a pin or any other object which may be releasably engaged with a receptacle. Each insert may include an electronic identifier operable to communicate with an electronic controller when the insert is disposed within a respective receptacle. For some applications each receptacle and associated insert may be operable to communicate real time data with an electronic controller.

The term "electronic identifier" may be used in this application to refer to all types of electronic devices which may be securely engaged with a respective insert to communicate at least a unique identification such as a serial number associated with the respective insert. Examples of an electronic identifier may include, but are not limited to, an addressable switch, an RFID tag, a magnetic strip, or a smart card. One example of an addressable switch includes a one wire switch available from Dallas Semiconductor and sold under the registered trademark iButton®. However, the present disclosure is not limited to addressable switches and/or one wire switches.

The term "electronic controller" may be used in this application to refer to an audit device, a general purpose computer or an electronic processor having wireless transmission and/or wire-line transmission capabilities. The electronic controller may be operable to communicate real time data with a network operations center (NOC), remotely located equipment, other service vehicles and/or handheld devices.

FIG. 1 is a schematic drawing showing a block diagram of portions of a system for collecting, storing and communicating data and other information associated with operation of remotely located equipment such as, but not limited to, vending machines or service vehicles. The data may include the status of various components associated with the remotely located equipment and transactions conducted at the remotely located equipment including, but not limited to, locking and unlocking a door to provide access to interior portions of the remotely located equipment. For some applications a mobile container incorporating teachings of the present disclosure may be satisfactorily used to store one or more keys used to obtain access to the remotely located equipment.

Data collecting, storing and communication system 20 may be satisfactorily used with vending machine 50 and/or other types of remotely located equipment. System 20 may include one or more handheld integration audit devices (handheld devices) 40. Vending machine 50 may include vending machine controller (VMC) 52 operable to control and monitor various electronic components and mechanical components associated with vending machine 50. Vending machine 50 may also include audit device 54 having memory 56 and firmware 58. System 20 may also include network operations center 26.

Audit device 54 may be operable to obtain DEX data via DEX interface or communication link 60 from vending machine controller 52. Audit device 54 may also be operable to obtain multi-drop bus (MDB) data via MDB interface or communication link 62 from vending machine controller 52. Audit device 54 may also obtain MDB data from various peripherals including, but not limited to, cashless reader 64. Audit device 54 may archive or store the DEX data and MDB data in memory 56.

Audit device 54 of vending machine 50 may be operable to communicate with handheld device 40 and/or electronic controller 94 disposed within electronic enclosure 90. See FIG. 2. For some applications, handheld device 40, audit device 54 and/or electronic controller 94 may be equipped with one or more wireless transceivers. Examples of wireless communications that may be satisfactorily used with handheld device 40, audit device 54 and electronic controller 94 include, but are not limited to, BLUETOOTH, IEEE802.11a, IEEE802.11b and IEEE802.11g. For some applications handheld device 40, audit device 54 and electronic controller 94 may include respective BLUETOOTH transceivers (not expressly shown).

Audit device 54 may be operable to perform some or all of the functions of an application host such as described in U.S. Pat. No. 6,457,038, entitled "Wide Area Network Operations Center that Sends and Receives Data from Vending Machines" and U.S. Pat. No. 6,925,335 entitled "Real-Time Alert Mechanism for Monitoring and Controlling Field Assets Via Wireless and Internet Technologies." For example, audit device 54 may communicate with NOC 26 using communication link 78. Various types of wire-line transmissions and wireless transmission techniques may be used as part of communication link 78. Handheld device 40 may communicate with NOC 26 using communication link 78a.

Various communication networks and communication techniques may be satisfactorily used to communicate data and other information between the various components associated with system 20. Examples of such communication networks may include, but are not limited to, wide area networks 24a, public communication networks 24b and client networks or private networks 24c. Each of these networks may include a wide variety of wire-line transmission techniques and/or wireless transmission techniques. For example, public communication networks 24b may include, but are not limited to, a public switched telephone network (PSTN), the Internet, IP telephony or voice over IP (VoIP), cable networks and a wide variety of wireless networks which are being developed in many communities for access by the general public. The boundary lines or dividing lines between "conventional" wide area networks, public communication networks and client networks or private networks are subject to substantial variations, overlaps and rapid change as communication technology and techniques are developed.

Communication link or interface 74 such as shown in FIG. 1 may allow communication of electrical signals between handheld device 40 and audit device 54. Also, link 74 may provide electrical power from secure power source 72 to handheld device 40. Alternatively, in the event of an emergency at vending machine 50, handheld device 40 may provide electrical power through link 74 to operate audit device 54. A similar link 98 may be provided between handheld device 40 and secure power source 92 disposed within electronic enclosure 90. See FIG. 2. Such wire-line connections provide multiple redundancy with respect to the data communication and supplying power required to operate handheld device 40, audit device 54 and/or electronic controller 94.

When handheld device 40 and audit device 54 communicate with each other over wire-line link 74 or wireless communication link 76, DEX data and MBD data stored in memory 56 may be transferred on demand to handheld device 40. In addition to DEX data and MDB data, audit device 54 may record and store other transactions or activities associated with vending machine 50. For example audit device 54 may record information concerning transactions such as the frequency, date and time and the identity of each engagement and disengagement of electronic lock 66. In addition, audit device 54 may record operational matters such as compressor failure, vend failures, inventory depletion, correct change events, user selected events as well as other data associated with modern electronic vending machine activities and transactions.

Vending machine 50 may include one or more hardware devices or peripheral devices operable to accept cash, noncash payment tokens and/or wireless payments. Cashless reader 64 may be representative of such hardware devices and peripherals. Cashless reader or cashless media device 64 may be operable to accept noncash payment tokens such as credit cards, RFID (Radio Frequency Identification Devices) or other media representative of noncash payment.

Vending machine 50 may include electronic lock 66 operably coupled with audit device 54. Electronic lock 66 may be commanded to engage or disengage in response to signals from audit device 54. Audit device 54 may operate electronic lock 66 by supplying appropriate power and/or digital control signals thereto. For example, audit device 54 may receive a command from handheld device 40 to initiate a sequence for unlocking electronic lock 66. Some vending machines and other types of remotely located equipment associated with data collecting, storing and communication system 20 may have only a mechanical locking device (not expressly shown) operated by a conventional key.

For some applications an electronic key (not expressly shown) may be used to initiate opening of an electronic lock. For such applications portions of an electronic reader (not expressly shown) may be disposed on exterior portions of vending machine 50. The electronic reader may be operable to respond to an electronic key and send an appropriate signal to audit device 54 to initiate a sequence for unlocking electronic lock 66.

The unlocking sequence may include a request from audit device 54 to electronic lock 66 to obtain a serial number associated with electronic lock 66. Audit device 54 may use a serial number or other information associated with electronic lock 66 to confirm that the electronic key is authorized for use in opening electronic lock 66 and associated vending machine 50. Handheld device 40 may also be used to initiate an unlocking sequence via audit device 54.

Vending machine 50 may include vending hardware 68 and inventory 70. Examples of vending machine hardware 68 may include, but are not limited to, one or more inventory dispensing apparatus, one or more coin acceptance and verification mechanisms, one or more bill acceptance and validation mechanisms or any other hardware device associated with vending machines. Vending machine 50 may also include secure power source 72 operably coupled to audit device 54. For some applications secure power source 72 may be used to provide power to audit device 54 in the event of power failure to vending machine 50 or at other selected time periods.

As shown in FIG. 1, secure power source 72 may be connected with handheld (handheld device) 40 via link or interface 74. Link or interface 74 may include a contact point or port external to vending machine 50 along with one or more suppression and power conditioning hardware devices (not expressly shown) to guard against electronic attack.

Handheld device 40 may be operable to communicate with audit device 54 and electronic controller 94 (see FIG. 2) using software applications 44. Communication techniques including personal area networks (PAN), local area networks (LAN) and wide area networks (WAN) may be used by an audit device, electronic controller and/or handheld device. The audit device, electronic controller and/or handheld device may be operable to provide location information using commercially available global positioning systems (GPS).

Figure 2:
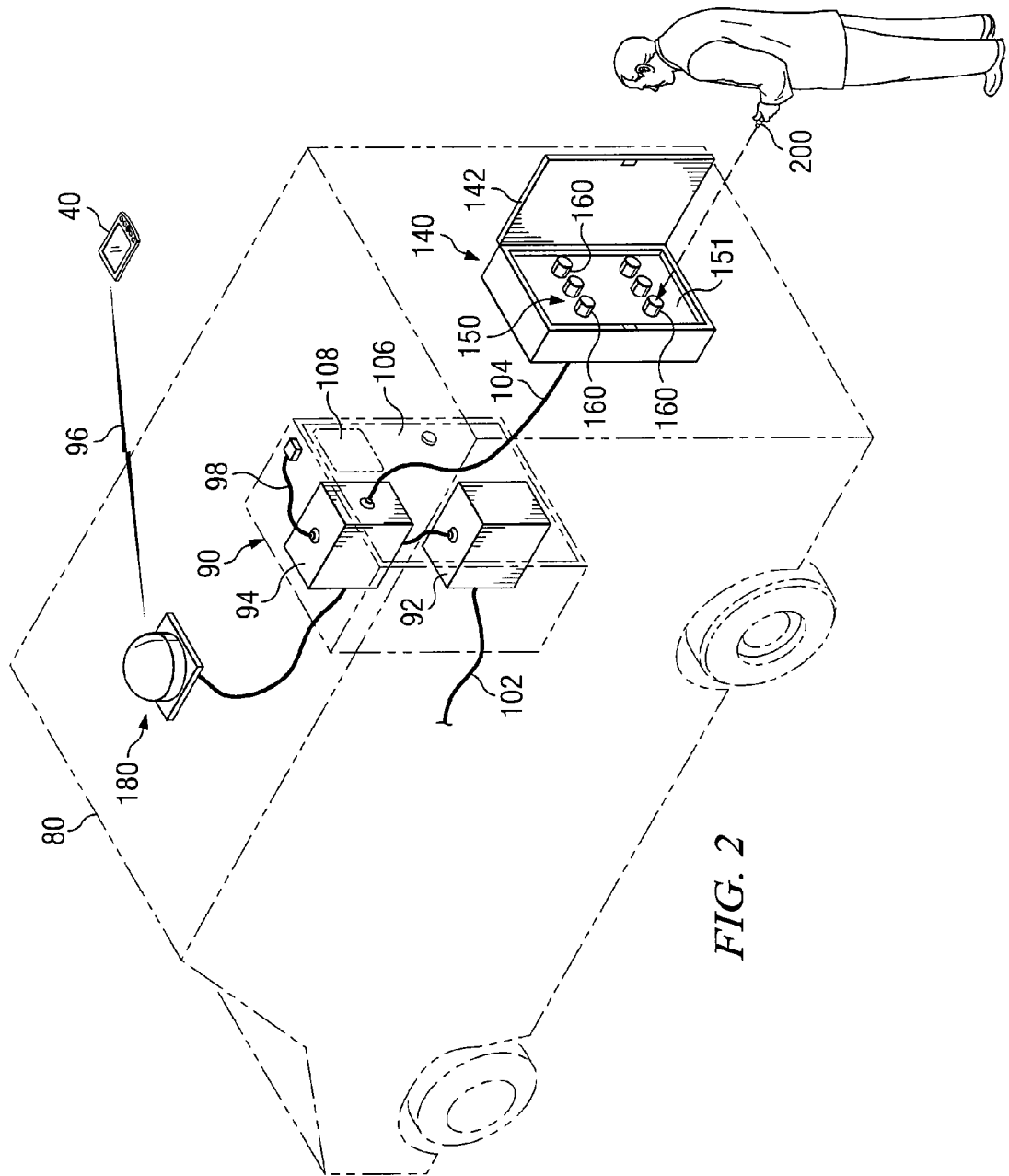
FIG. 2 is a schematic drawing showing an isometric view of a service truck having an electronic controller and a mobile storage container incorporating teachings of the present disclosure.

A mobile container and electronic controller incorporating teachings of the present disclosure may be installed within various types of service vehicles. For embodiments of the present disclosure such as shown in FIG. 2, service truck 80 may include electronic enclosure 90 and storage container 140. Electronic enclosure 90 may include various components such as secure power source 92 and electronic controller 94. Electronic enclosure 90 may include door assembly 108 operable to be locked and sealed to prevent unauthorized access by personnel using service vehicle 80. Door assembly 108 may have various types of locking mechanisms (not expressly shown) and/or sensors attached thereto and/or mounted thereon. Various types of enclosures which may be locked and sealed are commercially available for use as electronic enclosure 90.

For some applications, secure power source 92 may have characteristics and features similar to previously described secure power source 72. Electronic controller 94 may also have characteristics and features similar to previously described audit device 54 and/or electronic controller 336. See FIG. 5. For some applications, various types of general purpose computers having both wireless and wire-line transmission capabilities may be satisfactorily used as electronic controller 94.

For some applications, door assembly 106 of electronic enclosure 90 may include window 108 covered with clear plastic material. One or more light emitting diodes (LEDs) may be visible through window 108 to allow monitoring the status of secure power source 92 and/or electronic controller 94. The plastic covering for window 106 may be operable to allow wireless transmissions, for example BLUETOOTH, therethrough. A reset button (not expressly shown) may also be available inside electronic enclosure 90 when door assembly has been opened by authorized personnel.

Various wire-line and/or wireless communication links may be established between electronic enclosure 90 and other components. For example, first cable or wire-line interface 102 may be provided to couple secure power source 92 with an electrical power distribution system (not expressly shown) associated with service vehicle 80. Second cable or wire-line interface 104 may be provided between electronic enclosure 90 and storage container 140. Cable 104 may be used to communicate data and other information between components disposed within storage container 140 and electronic controller 94. Cable 104 may also be used to provide electrical power from secure power source 92 to various components disposed within storage container 140.

Various types of commercially available enclosures and containers may be satisfactory used as storage container 140. For some applications storage container 140 may be generally described as a lockable vault or safe. For such applications storage container 140 may include door assembly 142 with various types of locking mechanisms (not expressly shown) and/or sensors (not expressly shown) attached thereto and/or mounted thereon. For some applications door assembly 142 may include mechanical locking mechanisms such as a conventional key and locking cylinder or a combination of tumblers and lock bolts associated with a conventional safe. One or more sensors (not expressly shown) may be attached with storage container 140 to indicate when door assembly 142 has been opened and closed.

For some applications, electronic enclosure 90 and storage container 140 may have similar types of mechanical locking mechanisms (not expressly shown) and/or electronic locking mechanisms (not expressly shown). For other applications, electronic enclosure 90 and storage container 140 may have substantially different locking mechanisms. For example, storage container 140 may have an electronic lock operable to be opened in response to signals sent from handheld device 40 via electronic controller 94. For this same application, electronic enclosure 90 may have a mechanical lock which may be opened only by a mechanical key and/or a combination maintained by personnel located at a service center.

Electronic controller 94 may be operable to record and store a wide variety of transactions and other activities associated with storage container 140, valuable objects disposed therein, electronic enclosure 90 and/or other components associated with service vehicle 80. For some applications, electronic controller 94 may also be operable to communicate with network 24 in the same manner as previously described with respect to communication between audit device 54 and network 24. For example, electronic controller 94 may maintain a log or record of transactions such as the date, time and number of valuable objects removed from and returned to storage container 140. Electronic controller 94 may also be operable to monitor and record possible tampering with the contents of storage container 140 and/or electronic enclosure 90. Electronic controller 94 may also record the date, time and identity of each handheld device 40 which may request disengagement of an electronic lock associated with either storage container 140 or electronic enclosure 90.

For some applications electronic controller 94 may be operable to monitor and record the status of various components associated with service vehicle 80. An antenna or other suitable interface (not expressly shown) may be provided to supply data from a global positioning system (GPS) to electronic controller 94 so that geographic locations may be recorded and/or transmitted to network operations center 24 along with the previously discussed data. As a result, a service center having access to network operations center 24 may be able to more effectively manage service vehicles to provide optimum maintenance and servicing of remotely located equipment and minimize requirements for service vehicles to return to the service center.

In the same or alternative embodiments, electronic controller 94 may be communicatively coupled to wireless communication module 180 operable to send and receive signals via one or more wireless links 96. Handheld device 40 and associated software 44 may provide a user interface operable to indicate the status of electronic controller 94, electronic enclosure 90 and/or storage container 140. Handheld device 40 may also be operable to send signals via electronic controller 94 using wireless link 96 to disengage and engage an electronic lock (not expressly shown) associated with storage container 140. Wireless link 96 may have characteristics similar to previously described wireless link 76.

Wire-line link 98 may be provided between electronic controller 94 and the exterior of electronic enclosure 90. Various types of cables (not expressly shown) may be used to couple handheld device 40 with wire-line link 98. As previously noted with respect to link 74 in FIG. 1, such wire-line connections provide multiple redundancy with respect to data communication and supplying power required to operate handheld device 40, audit device 54 and/or electronic controller 94.

For some applications an RFID reader or other type of electronic reader (not expressly shown) may be attached to link 98. Alternatively, a wireless RFID reader or other wireless electronic readers (not expressly shown) may be used to communicate with electronic controller 94 via wireless link 96 and wireless communication module 180. As a result, electronic controller 94 may be used to record usage of tools and changes in repair part inventory carried in service vehicle 80. Such data may be transferred real time to a service center (not expressly shown) via network 24 or may be downloaded when vehicle 80 returns to a service center after daily, weekly or even longer time periods.

Figure 3A:
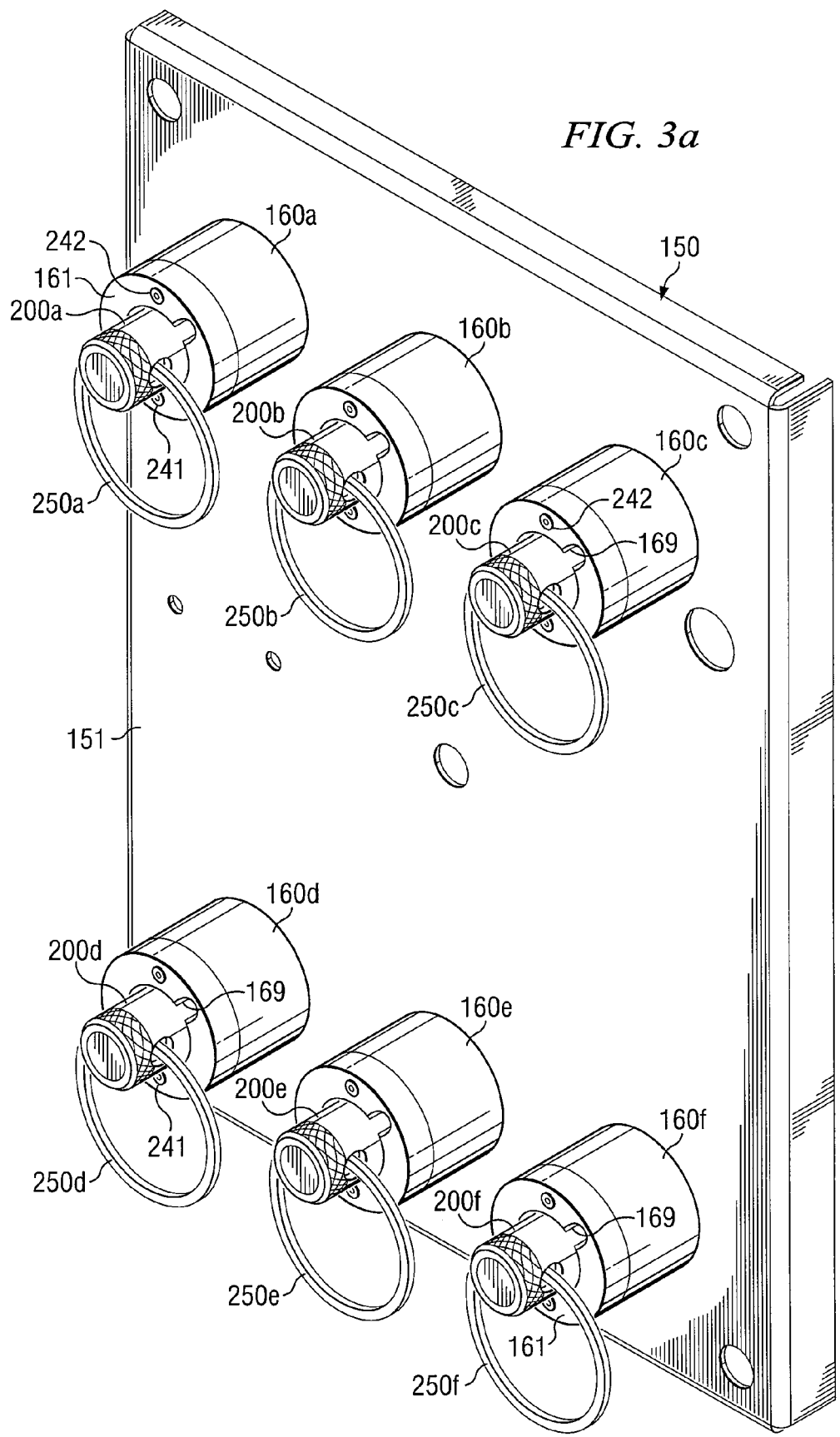
FIG. 3a is a schematic drawing showing an isometric view of a panel having a plurality of receptacles and a plurality of inserts releasably engaged with respective receptacles in accordance with teachings of the present disclosure.
Figure 3B:
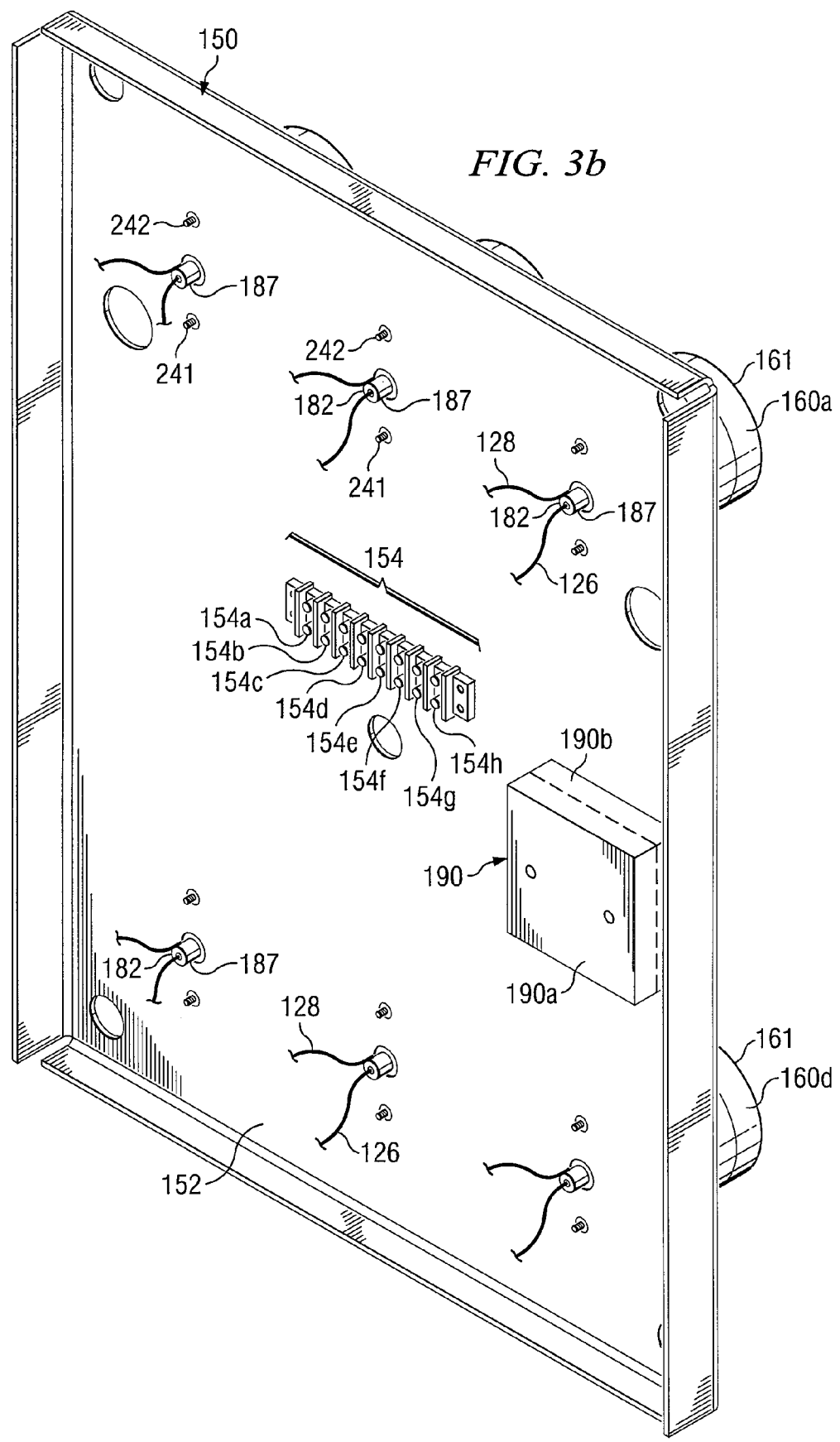

For some applications panel 150 such as shown in FIGS. 3A and 3B may be disposed within interior portions of storage container 140. Various types of mechanical fasteners (not expressly shown) may be satisfactorily used to engage panel 150 with interior portions of storage container 140. For embodiments such as shown in FIGS. 2, 3A and 3B, a plurality of receptacles 160 may be securely engaged with front surface or first surface 151 of panel 150. Receptacles 160 may sometimes be generally described as "sockets." Electronic controller 94 may receive signals from panel 150 to indicate when inserts or valuable objects are engaged with and disengaged from receptacles 160.

One or more sensors operable to detect possible tampering with storage container 140 and/or valuable objects disposed therein may also be provided. For example, back surface or second surface 152 of panel 150 may include a sensor operable to indicate any attempt to remove panel 50 from interior portions of storage container 140. As a further example, a housing 190 with a sensor (not shown) disposed therein may be securely attached with second surface 152, various types of mechanical fastening techniques (not expressly shown) and/or bonding techniques may be used. For some applications housing 190 may include base 190b and covering 190a. Both base 190b and covering 190a may include a cut out or recessed portion (not shown) having dimensions and configurations compatible with disposing a sensor therein.

For some applications the sensor may be an addressable switch available from various companies. For such applications a signal wire and a ground wire (not expressly shown) may extend from the sensor through a cut out or recessed portion formed in housing 190.

Various electrical connections may be provided on back surface or second surface 152 of panel 150. For embodiments such as shown in FIG. 3B, a plurality of electrical contacts 154 may be disposed on second surface 152 of panel 150. A plurality of electrical wires may extend from each socket or receptacle 160 to respective contacts 154. A pair of wires (not expressly shown) may also extend from a sensor in housing 190 to respective pairs or sets of contacts 154. Second cable 104 from electronic enclosure 94 may include a pair of wires (not expressly shown) engaged with respective contacts 154.

For purposes of describing various features of the present disclosure, respective sets of contacts 154 have been designated as a, b, c, d, e, f, g and h. For some applications electrical wires such as respective signal wire 126 and ground wire 128 extending from end 182 of each socket or receptacle 160a-160e may be engaged with respective sets of contacts 154a-154e. The wires extending from housing 190 may be engaged with contacts 154g. The wires extending from second cable 104 may be engaged with contacts 154h. Signal wires 126 may be used to communicate data and other information between electronic controller 94, respective socket 160a-160e and/or associated insert 200.

For some applications receptacles 160 may have similar configurations, dimensions and functions. For such applications all inserts 200 may have similar configurations, dimensions and functions. As a result, each insert 200 may be releasably engaged with any receptacle 160. For other applications, each receptacle and each insert may have unique configurations and/or unique dimensions such that each insert may be releasably engaged with only a specific receptacle (not expressly shown).

For purposes of describing various features of the present disclosure receptacles 160 as shown in FIGS. 3A and 3B have been designated 160a, 160b, 160c, 160d, 160e and 160f. Inserts 200 have been designated 200a, 200b, 200c, 200d, 200e and 200f and key rings 250 have been designated 250a, 250b, 250c, 250d, 250e and 250f for the same reason. However, for embodiments such as shown in FIGS. 3A and 3B each receptacle 160 may have substantially the same configuration and dimensions and each insert 160 may have substantially the same configuration and dimensions. Key rings 250 may also have substantially the same configuration and dimensions satisfactory for attachment with each insert 200.

For embodiments such as shown in FIGS. 3A and 3B, six (6) receptacles 160 are shown securely engaged with first surface 151 of panel 50. Respective inserts 200a-200f are shown engaged with respective receptacles or sockets 160a-160f. Various types of valuable objects may be securely engaged with each insert 200a-200f. For some applications, respective key ring 250a-250f may be securely engaged with respective insert 200a-200f. Keys (not expressly shown) associated with various types of mechanical locking mechanisms may also be engaged with each key ring 250a-250f. For such applications inserts 200a-200f may be referred to as "fobs" when key rings and keys are attached thereto. However, a wide variety of valuable objects other than keys and key rings may be securely engaged with inserts formed in accordance with teachings of the present disclosure.

Each insert 200a-200f may include electronic identifier 210. For some applications an addressable switch such as a "one-wire" addressable switch may be satisfactorily used as electronic identifier 210. Examples of such electronic identifiers include, but are not limited to, iButtons available from Dallas Semiconductor. Electronic identifier 210 may include a generally hollow enclosure or "can" formed from electrically conductive material such as stainless steel.

An example of one or more service vehicles interfaced through a wireless network is depicted by FIG. 5. A remote data acquisition system for service vehicles, indicated generally at 10 communicates information from service vehicles externally over a wide area wireless network (WAN). System 10 may include only one service vehicle 80 or a plurality of service vehicles 80. Each service vehicle 80 may include electronic controller 94, storage container 140, and other hardware as described in FIG. 2 for electronically tracking information relating to the service vehicle.

As described in greater detail with respect to FIGS. 6a, 6b, 7, 8 and 9, electronic controller 94 may include a wireless interface and one or more transceivers for WAN, LAN and point-to-point communications. In addition, as described in greater detail with respect to FIG. 2, electronic controller 94 may be operable to record and store a wide variety of transactions and other activities associated with remotely located equipment, for example storage container 140 (e.g., electronic controller 94 may maintain a log or record of transactions such as the date, time and number of valuable objects removed from and returned to storage container 140) or service vehicle 80, and monitor and record the status of various components associated with service vehicle 80. Electronic controllers 94 may communicate with one another and one or more user interfaces (e.g., handheld device 40) via onboard wireless transceivers using wireless transmissions 18.

Electronic controllers 94 may also communicate directly with each other and with network 24 to act as repeaters in case another electronic controller 94 or user interface 34 cannot directly communicate with a particular electronic controller 94 while another electronic controller 94, which does have an established communication link with network 24, is able to directly communicate.

The network interface of system 10 may be implemented in one of a number of ways. In particular, system 10 is designed to support a network 24 that can be implemented via wireless transmissions. For example, if a wireless narrowband PCS paging network is used to implement the network, messages from one or more electronic controllers 94 may be communicated as digital messages through the pager network and stored in one or more dedicated message mailboxes provided by the wireless network operator. These mailboxes may be securely accessed, for example, through an Internet-based connection.

As shown in FIG. 5, a network operations center (NOC) 26 may communicate with one or more service vehicles 80 across wide area network 24. As mentioned, in one implementation, network operations center 26 may access mailboxes that store message transmitted by electronic controllers 94 of service vehicles 80. In the depicted embodiment of FIG. 5, network operations center 26 may include a NOC control 28 that communicates with network 24 through a WAN interface 29. NOC control 28 may receive data acquired from and transmit data to service vehicles 80, process the data and store the data into a database 30. NOC control 28 may also perform instant alert paging, direct dial alarms and other functions to provide real time notification to a service vehicle operator upon the occurrence of certain events (e.g., removal of contents of storage container 140, vandalism, etc.). NOC control 28 may also provide third party transaction processing such as allowing queries on database 30. The WAN interface 29 between NOC control 28 and the network 24 may be implemented through the use of either wire-line or wireless transmissions.

At network operations center 26, a client access point 32 may provide access from a client interface subsystem (CI) across external network 24. In one implementation, client access point 32 may be a web-based interface allowing user access from a client computer across a network such as the Internet. Other implementations may include providing a direct-dial connection between client interface subsystem 34 and client access point 32. Once connected, a user may use user interface 34 to obtain information from database 30 based upon data acquired from service vehicles 80. Further, users may be provided with extended services such as trend information developed by mining and analyzing database 30.

Figure 6A:
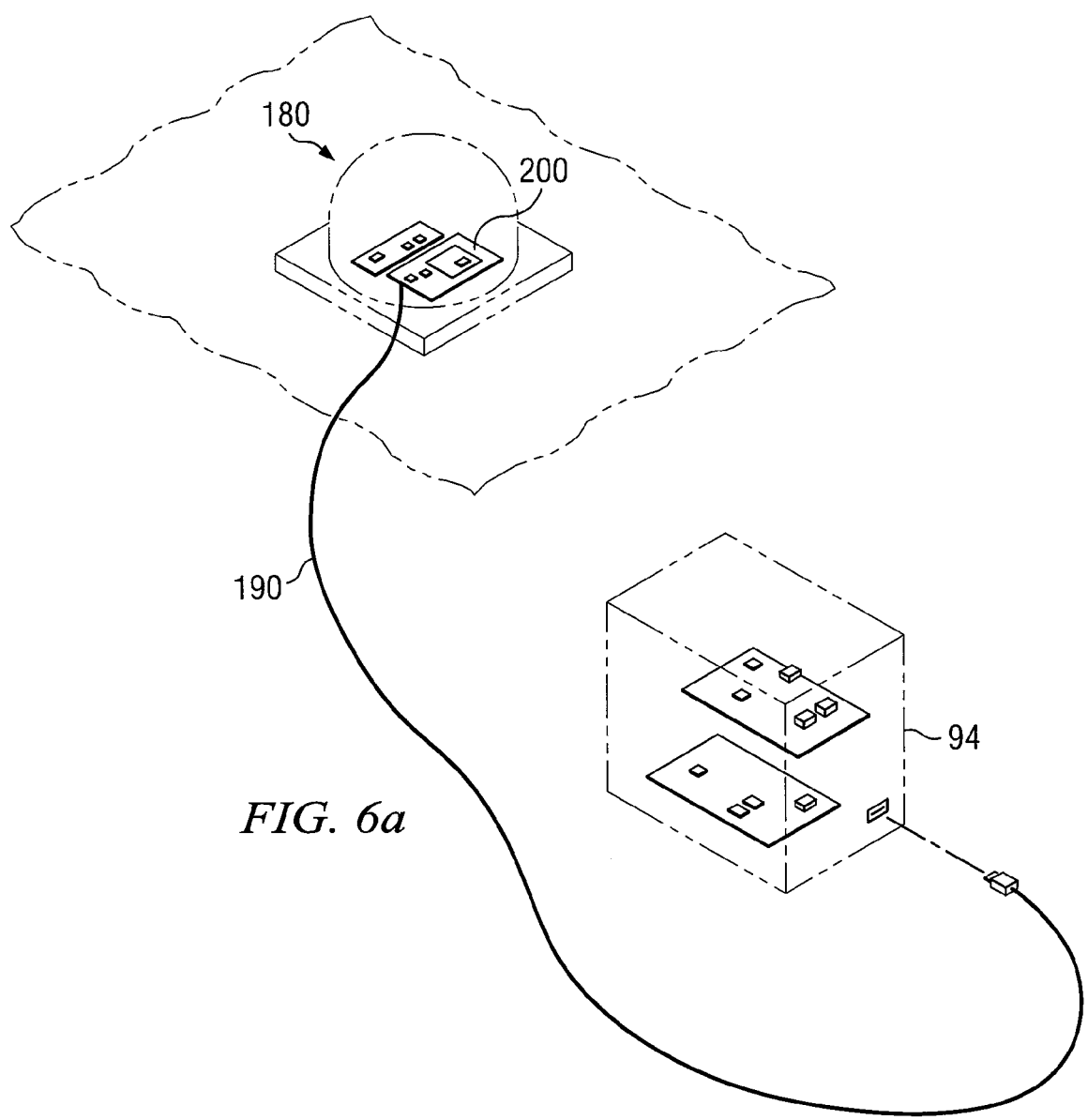
FIG. 6a is a schematic drawing showing an electronic controller coupled to a wireless communication module in accordance with the teachings of the present disclosure.

Referring now to FIG. 6a, electronic controller 94 may be coupled to a wireless communication module 180 via a data cable 190, e.g. a universal serial bus (USB) cable. Wireless communication module 180 may include one or more wireless interface modules 300 operable to communicate wireless signals between electronic controller 94 and wireless link 96.

Figure 6B:
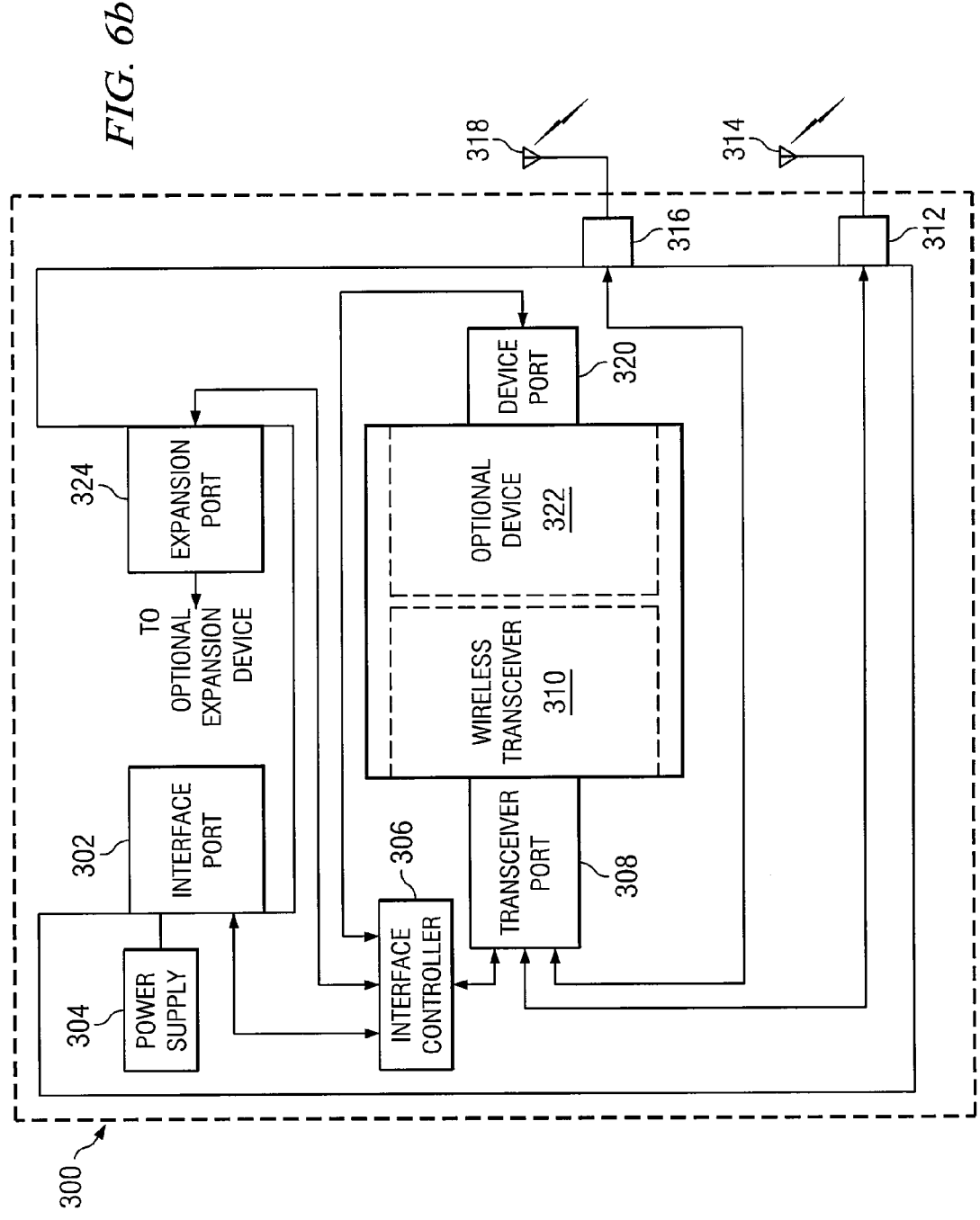
FIG. 6b is a schematic drawing showing a block diagram of a wireless interface module configured to accept a wireless transceiver for interfacing an electronic controller with a wireless network according to one aspect of the present disclosure.

Referring now to FIG. 6b, a block diagram of wireless interface module 300 according to one aspect of the present disclosure is depicted. Wireless interface module 300 may include an interface port 302, such as an industry standard interfaces for PCI, ISA, PC104, USB or other industry standard interfaces operable to provide a communication, data, and/or power interface to electronic controller 94 illustrated in FIG. 2.

Wireless interface module 300 may have a transceiver port 308 operable to removably couple one or more wireless transceivers 310 to communicate signals to and from wireless interface module 300 transmitted to or received from wireless transceivers 310. Wireless interface module 300 may also include coaxial plugs 312 and 316 each operable to couple an antenna.

Wireless interface module 300 may integrate with electronic controller 94 to obtain power or may include an optional power supply 304 operable to supply power to circuitry coupled to wireless interface module 300. Optional power supply 304 may provide power to wireless transceiver 310 coupled to transceiver port 308, with specific levels of power provided to different transceivers as required. Alternatively, if wireless interface module 300 lacks a power supply, it may pass power from the controller 94 to wireless transceiver 310.

Wireless interface module 300 may be operable to accept data and power from the machine control system 94 and to prepare the data for transmission across a wireless network. Similarly, wireless interface module 300 may accept and process command and control data from a wireless network for transfer to electronic controller 94. For instance, wireless interface module 300 may prepare data for transmission to a wireless transceiver 310 that may communicate with an associated wireless network and may execute tasks, such as fetching status from electronic controller 94, based on command and control data received from the network through wireless transceiver 310. By removably coupling different types of wireless transceivers 310 to wireless interface module 300, electronic controller 94 may be enabled to communicate over different types of networks. For some applications, wireless interface module 300 may have characteristics and features similar to wireless interface module 440. See FIGS. 7 and 8.

Wireless interface module may also include an interface controller 306. Interface controller 306 may be any suitable apparatus or system for providing processing, routing and connectivity among the various components of wireless interface module 300, e.g. a four-port USB controller as in known in the art.

Wireless interface module 300 may also include one or more serial data ports, such as universal serial bus (USB) data ports 320 and 324 for example, operable to couple one or more optional peripheral device(s) 322 and/or one or more additional wireless interface modules 300 in a daisy chain fashion. Peripheral device(s) 322 may include multi-media devices, readers/storage devices, additional wireless interface modules 300, additional wireless transceivers 310, or other devices used in association with wireless interface module 300.

Various different types of wireless networks exist and, as such, wireless transceiver 310 may be configured to communicate with one or more wireless networks. For some applications, wireless transceiver 310 may have characteristics and features similar to wireless transceiver 444. See FIGS. 7-9. Wireless transceiver 310 advantageously allows a machine control system to communicate with one or more wireless networks by being a removable wireless transceiver that may be replaced with alternative wireless transceivers operable to communicate with different associated wireless communication networks. For example, a first wireless transceiver may include a GSM transceiver circuit operable to communicate with a GSM network. To convert a service vehicle to communicate with an analog network, the GSM wireless transceiver may be removed and replaced with an analog wireless transceiver configured to communicate via an analog wireless communication network. Wireless communication of information may be provided in one or more ways. Some examples of wireless communication networks and protocols operable to be used with the present disclosure may include, but are not limited to, CDMA, GSM, TDMA, PCS, GPRS, CDPD, AMPS, REFLEX and UMTS.

In one embodiment of the disclosure, plural wireless interface modules 300 may be coupled to electronic controller 94 in a daisy chain fashion. For example, port 324 may optionally couple additional wireless interface modules 300 to electronic controller 94 in a daisy chain fashion. Each wireless interface module 300 in a daisy chain may also be coupled to a wireless transceiver 310 via its respective transceiver port 308. Using a plurality of wireless interface modules 300 advantageously allows a machine control system to simultaneously communicate with a plurality of wireless networks as it allows electronic controller 94 to communicate with different associated wireless communication networks without requiring removal or replacement of individual wireless transceivers 310. For example, a first wireless transceiver 310 coupled to a first wireless interface module 300 may include a GSM transceiver circuit operable to communicate with a GSM network, a second wireless transceiver 310 coupled to a second wireless interface module 300 may include a PCS transceiver circuit operable to communicate with a PCS network, a third wireless transceiver 310 coupled to a third wireless interface module 300 may include a CDMA transceiver circuit operable to communicate with a CDMA network, and so on. Thus, as the quality of service of wireless networks vary among geographical regions, an embodiment utilizing a plurality of wireless interface modules 300 and a plurality of wireless transceivers 310 coupled thereto advantageously allows electronic controller 94 to communicate over alternative wireless networks in the event that one or more of the wireless networks supported by wireless transceivers 310 do not provide adequate quality of service in a particular geographical area.

In operation, a manufacturer of remotely located equipment, e.g., a service vehicle or a vending machine, builds the equipment as wireless-ready by incorporating one or more wireless interface modules 300 to communicate with the electronic controller 94. A technician need only attach appropriate wireless transceivers 310 to wireless interface modules 300 to interface the remotely located equipment with the associated wireless networks. The technician simply tests reception at the location, for instance by installing different transceivers or through conventional coverage analysis techniques, to determine the most suitable wireless networks and then installs the associated wireless transceivers 310. Wireless interface modules 300 detect the transceivers and networks that are being used and adapt the low-level communication protocols to handle transmission and reception with the network while maintaining the application level communications protocol fixed.

Figure 7:
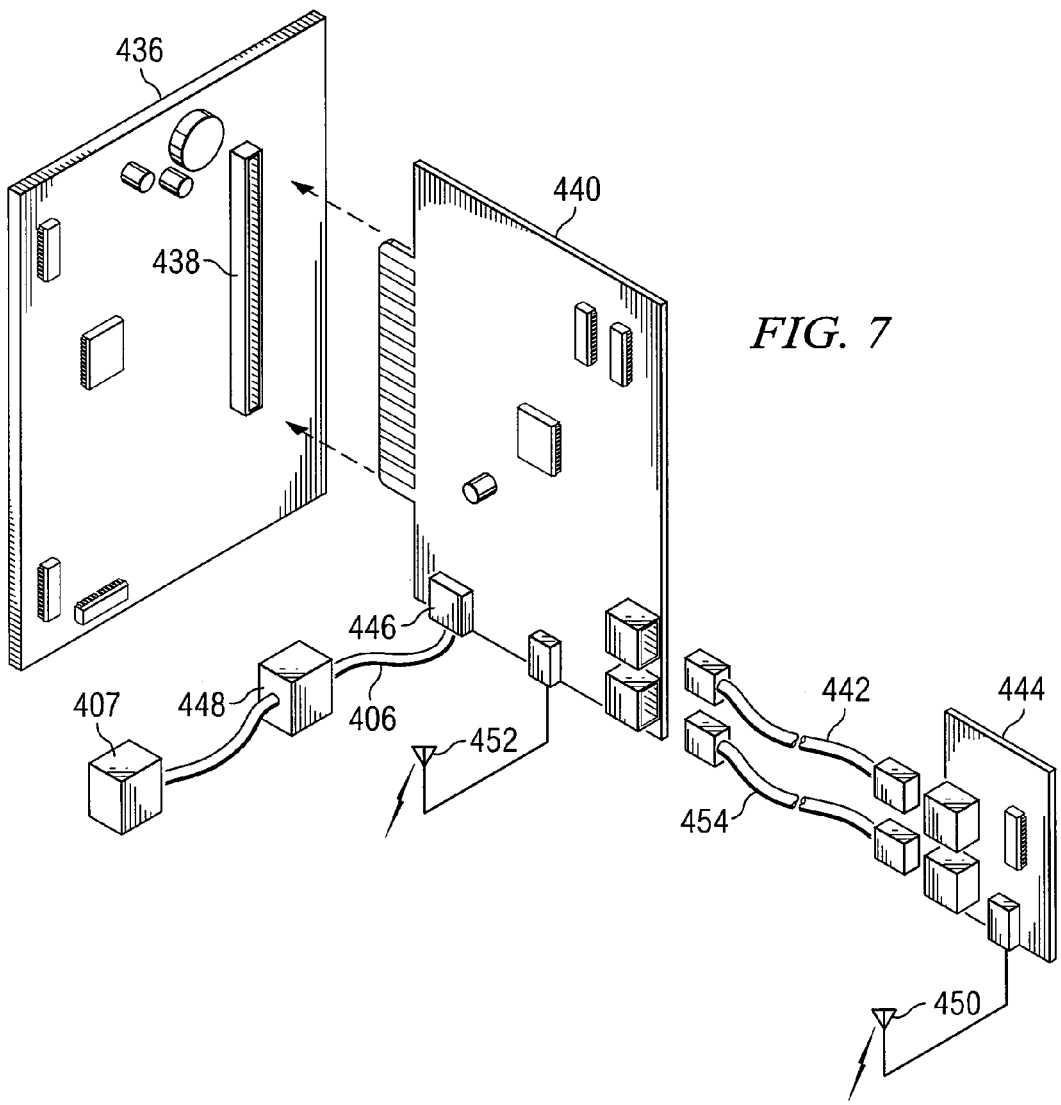
FIG. 7 illustrates a block diagram of a system incorporating a wireless interface module and wireless transceiver for communicating with a wireless network according to one embodiment of the disclosure.

Referring now to FIG. 7, a schematic illustration of a system operable to communicate with a wireless network according to one aspect of the present disclosure is depicted.

An electronic controller 436 for use in remotely located equipment is depicted that may include a bus interface, depicted as a slot or connector 438. Electronic controller 436 may be conventional hardware, firmware and software associated with remotely located equipment, e.g., vending machine 50 in FIG. 1 or service vehicle 80 in FIG. 2, and may also have characteristics and features similar to previously described audit device 54 and/or electronic controller 94 except that an interface slot 438 provides a standardized bus interface slot for accepting a wireless interface module 440. Electronic controller 436 may control vending machine or service vehicle electronic devices and may communicate data relating to vending machine 50 or service vehicle 80 information through slot 438 to wireless interface module 440. Interface slot 438 may be any computer industry standard interface, such as industry standard interfaces including a PCI, ISA, PC104, or any other suitable slot interface operable to communicate data and power to cards inserted in the slot.

Wireless interface module 440 may be operable to accept data and power from electronic controller 436 and to prepare the data for transmission across a wireless network. Similarly, wireless interface module 440 may accept and process command and control data from a wireless network for transfer to electronic controller 436. For instance, wireless interface module 440 may prepare data for transmission through a data cable 442 to a wireless transceiver 444 that may communicate with an associated wireless network and may execute tasks, such as fetching status from electronic controller 436, based on command and control data received from the network through wireless transceiver 444. By removably coupling different types of wireless transceivers 444 to wireless interface module 440, electronic controller 436 may be enabled to communicate over different types of networks. In some embodiments, wireless interface module 440 may have characteristics and features similar to previously described wireless interface module 300. In addition, in the same or alternative embodiments, wireless transceiver 444 may have characteristics and features similar to previously described wireless transceiver 310.

Wireless interface module 440 may also include a serial data port, e.g., universal serial bus (USB) data port 446, operable to couple one or more peripheral(s) 448 in a daisy chain fashion. Peripheral(s) 448 may include multi-media devices such as a speaker operable to output audio signals received via wireless interface module 440, an E-lock, or a video screen. In the same or alternative embodiments, a BLUETOOTH wireless system may interface with wireless interface module 440 through USB port 446 to provide a personal area network that can be used by vending consumers to interact with the vending machine, such as for performing wireless financial or cash transactions. LED lights associated with wireless interface module 440 may provide visual indications of the operability and current functions of the system.

To communicate with wireless networks, a wireless antenna 450 may be coupled to wireless transceiver 344 to receive and send wireless signals. In the same or alternative embodiments, a wireless antenna 452 may couple to wireless interface module 440 and may communicate with wireless transceiver 444 through a coaxial cable 454. Wireless transceiver 444 may communicate with and receive power from wireless interface module 440 through a data and power cable 442.

In one embodiment of the disclosure, plural wireless transceivers 444 are coupled to wireless interface module 440 via data and power cable 442. For example, if more than one wireless transceivers 444 are coupled to wireless interface module 440, then a data line, such as a USB data line, and additional coaxial cables 454 may be used to couple one or more antennae for communication with a wireless network. Similarly, USB port 446 may optionally couple USB-compatible peripherals, such as one or more multi-media devices, readers/storage devices, wireless transceivers 444 or other devices used in association with wireless interface module 440.

It is understood that, in service truck 80 depicted in FIGS. 2-6b, wireless interface module 440 may be used in place of wireless interface module 300 (or vice versa) and/or wireless transceiver 444 may be used in place of wireless transceiver 310 (or vice versa).

Figure 8:
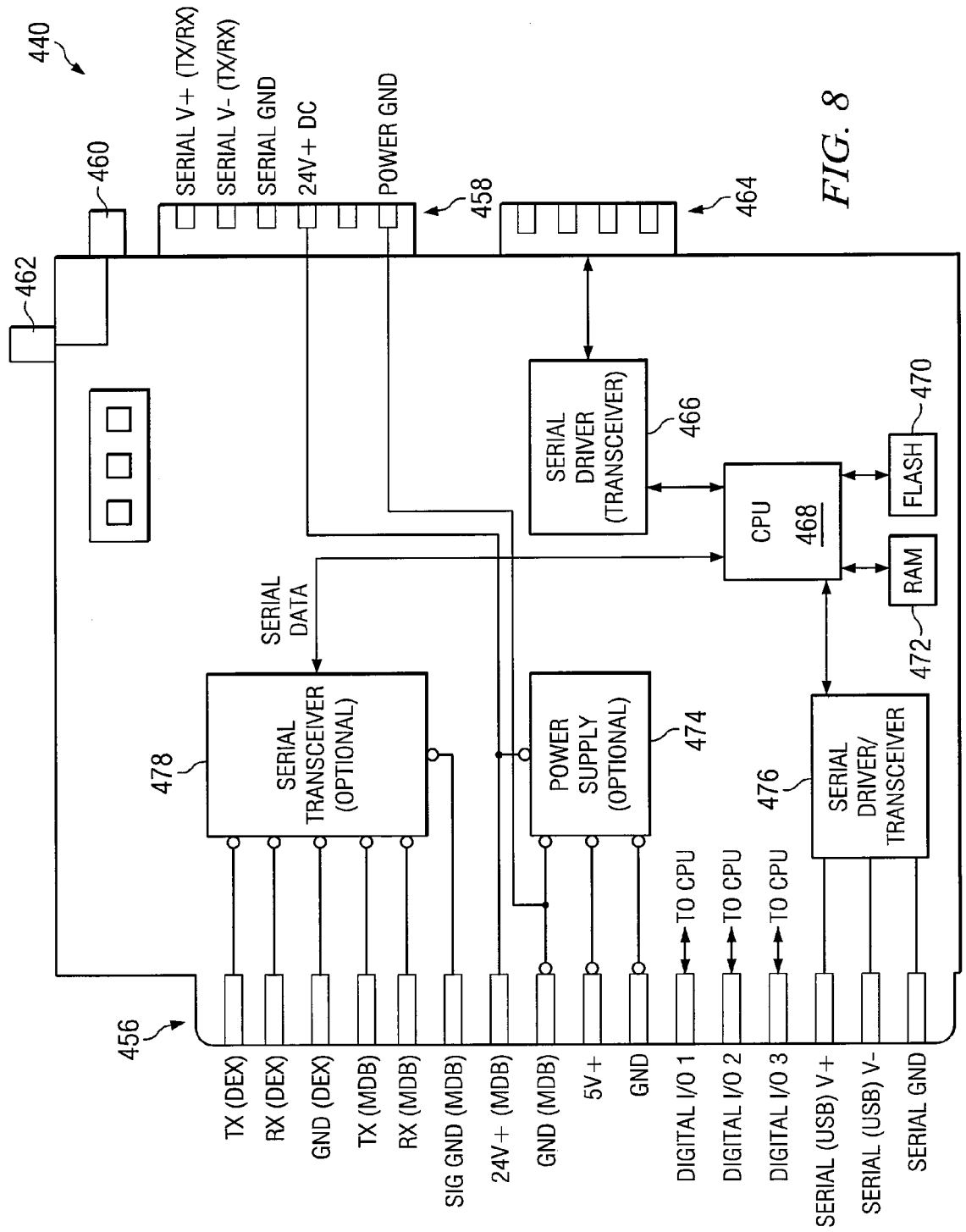
FIG. 8 illustrates a block diagram of a wireless interface module configured to accept a wireless transceiver for interfacing an electronic controller with a wireless network according to one aspect of the present disclosure.

Referring now to FIG. 8, a block diagram of a wireless interface module 440 according to one aspect of the present disclosure is depicted. Wireless interface module 440 may include an interface 456, such as industry standard interfaces for PCI, ISA, PC104, or other industry standard interfaces operable to provide a communication, data, and power interface to an electronic controller 436 slot 438 illustrated in FIG. 2.

Wireless interface module 440 may have a transceiver port 458 operable to removably couple one or more wireless transceivers 444 to communicate signals to and from wireless interface module 440 transmitted to or received from transceiver 444 as illustrated in FIG. 7. Wireless interface module 440 may also have a coaxial plug 460 operable to couple an antenna which may be coupled to a second coaxial plug 462. A serial bus 464 e.g., a universal serial bus (USB) may be coupled to a serial driver 466, CPU 468, flash memory 470 and random access memory 472.

Wireless interface module 440 may integrate with electronic controller 436 to obtain power or may include an optional power supply 474 operable to supply power to circuitry coupled to wireless interface module 440. Optional power supply 474 may provide power to transceiver 444 coupled to transceiver port 458, with specific levels of power provided to different transceivers as required. Alternatively, if wireless interface module 440 lacks a power supply, it may pass power from electronic controller 436 to wireless transceiver.

Serial driver/transceiver lines 476 may communicate information between wireless interface module 440 and slot 438 as needed. Interface 456 may provide a standard for simplified incorporation into vending machine or general purpose computer designs, such as industry standard interfaces that support a MDB multi-drop bus operable to transmit and receive information communicated via optional serial transceiver 478. Other types of standards available for exchanging information between electronic controller 436 wireless interface module 440 may include USB, DEX or industry specific data formats. Transceiver port 458 may also include serial transmit and receive lines including a serial ground and power supply lines operable to provide power to a wireless transceiver 444 coupled to wireless interface module 440.

Figure 9:
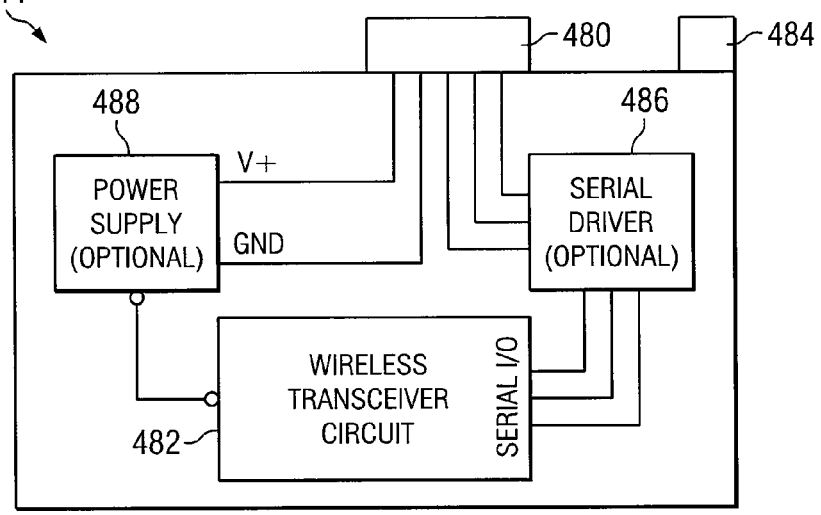
FIG. 9 illustrates a transceiver operable to communicate with a wireless network and configured to couple with a wireless interface module according to one aspect of the disclosure.

Referring now to FIG. 9, a block diagram of a wireless transceiver 444 is depicted that is operable to communicate information via a wireless network according to one aspect of the disclosure. Wireless transceiver 444 may interface with wireless interface module 440 illustrated in FIGS. 7 and 8 and may be removably coupled so that when in electrical communication, wireless transceiver 444 allows interface module 440 to communicate with a wireless communication network. Wireless transceiver 444 may include an interface receptacle 480 for communicating information and receiving power supplied by wireless interface module 440's power supply or power from system 436 routed through wireless interface module 440. Interface receptacle 480 may provide a standard connection with wireless interface module 440 regardless of the type of wireless transceiver circuit 482 and associated wireless network that is supported by wireless transceiver 444. Interface receptacle 480 may allow the wireless transceiver 444 to be removably coupled to wireless interface module 440 so that changing a system from an existing wireless network to a new wireless network may be accomplished by decoupling the existing wireless transceiver and replacing it by removably coupling a new wireless transceiver associated with the desired wireless network.

A coaxial cable receptacle 484 may be provided for coupling an antenna to wireless receiver 444. A wireless transceiver circuit 482 may be coupled to a serial driver 486 and generates and receives signals for communicating information with a wireless network, such as a GSM network, an analog network or a two-way paging network. In one embodiment, a power supply 488 may also be included for providing power to wireless transceiver circuit 482. Wireless transceiver 444 is preferably a printed circuit board which may be removably coupled to an interface module with conventional mounting hardware. Wireless transceiver 444 may be assembled inside a housing for simplified coupling to a system and may be configured to communicate with one or more predetermined wireless networks.

Various different types of wireless networks exist and, as such, wireless transceiver 444 may be configured to communicate with one or more wireless networks. Wireless transceiver 444 advantageously allows a control system to communicate with one or more wireless networks by being a removable wireless transceiver that may be replaced with alternative wireless transceivers operable to communicate with different associated wireless communication networks. For example, a first wireless transceiver may include a GSM transceiver circuit operable to communicate with a GSM network. To convert an item of remotely located equipment to communicate with an analog network, the GSM wireless transceiver is removed and replaced with an analog wireless transceiver configured to communicate via an analog wireless communication network. Wireless communication of information may be provided in one or more ways. Some examples of wireless communication networks and protocols operable to be used with the present disclosure may include, but are not limited to, CDMA, GSM, TDMA, PCS, GPRS, CDPD, AMPS, REFLEX and UMTS.

In operation, a manufacturer of remotely located equipment builds the equipment as wireless-ready by incorporating wireless interface module 440 to communicate with electronic control system 436. The equipment is then shipped to its operational location and provided power. A technician need only attach an appropriate wireless transceiver 444 to wireless interface module 440 to interface the vending machine with the associated wireless network. The technician simply tests reception at the location, for instance by installing different transceivers or through conventional coverage analysis techniques, to determine the most suitable wireless network and then installs the associated wireless transceiver 444. Advantageously, vending machines that are installed in network "dead zones" are simply equipped to operate with a communication system or network that has acceptable signal strength and desired data transfer ability and cost structures. Further, if the vending machine is moved at a future date, a suitable wireless transceiver 444 may be installed to convert the vending machine to a different network as needed with minimal cost, time and complexity. Wireless interface module 440 may detect the transceiver and network that is being used and adapts the low level communication protocols to handle transmission and reception with the network while maintaining the application level communications protocol fixed.

Although the present disclosure and its advantages have been described in detail, it should be understood that various changes, substitutions and alterations may be made thereto without departing from the spirit and scope of the disclosure as defined by the following claims.

What is claimed is:

1. A system for interfacing a controller with a plurality of wireless networks comprising:
   a wireless antenna coupled to a wireless interface module operable to send and receive wireless signals;
   the wireless interface module in communication with the controller;
   the wireless interface module having an interface operable to communicate with a plurality of wireless transceivers;
   the wireless interface module operable to communicate wireless signals between each wireless transceiver and the antenna;
   each of the wireless transceivers associated with at least one of the plurality of wireless networks;
   each wireless transceiver operable to be remotely coupled to the wireless interface module; and
   each wireless transceiver operable to send and receive wireless signals associated with one or more of the wireless networks.

2. The system of claim 1 wherein the controller comprises an audit device disposed in a service vehicle.

3. The system of claim 1 wherein the controller comprises a general purpose computer disposed in a service vehicle.

4. The system of claim 1 further comprising an interface operable to communicate wireless signals between each wireless transceiver and the wireless interface module.

5. The system of claim 4 wherein the interface comprises a respective coaxial cable coupled between the wireless interface module and at least one of the wireless transceivers.

6. The system of claim 1 further comprising:
   a first wireless transceiver operable to communicate with a primary wide area network;
   the first wireless transceiver removably coupled to the wireless interface module;
   a second wireless transceiver operable to be removably coupled to the wireless interface module; and
   the second wireless interface transceiver providing a local area network interface.

7. The system of claim 1 further comprising a multidrop interface associated with the wireless interface module.

8. The system of claim 1 further comprising:
   the wireless interface module having at least one serial port.

9. The system of claim 8 further comprising the USB port providing an interface for a BLUETOOTH wireless transceiver.

10. The system of claim 1 wherein the wireless interface module further comprising a port operable with an IEEE 802.11 wireless transceiver.

11. The system of claim 1 further comprising the wireless interface module operable to receive power from the controller.

12. The system of claim 1 further comprising the wireless interface module operable to supply power to an associated wireless transceiver.

13. The system of claim 1 further comprising:
   an addressable switch securely engaged with a panel; and
   the addressable switch operably engaged with the controller to monitor possible tampering with the panel.

14. The system of claim 1 further comprising:
   a door operable to be locked in a closed position to prevent unauthorized access to the panel disposed within the container; and
   the controller operable to monitor and record each time the door of the container is locked and unlocked.

15. The system of claim 14 further comprising at least one electrical cable extending between the container and the controller to allow the controller to monitor and control access to the container.

16. A system for monitoring and controlling access to a service vehicle comprising:
   a service vehicle and a controller;
   a first wireless transceiver associated with a first wireless network;
   a second wireless transceiver associated with a second wireless network and not operable to communicate over the first wireless network;
   a wireless interface module coupled to the service vehicle controller and capable of being used with the first and second wireless transceivers; and
   a selected wireless transceiver removably coupled to the wireless interface module, wherein the selected wireless transceiver is selected from the first and second wireless transceivers based on available wireless networks in a geographical location in which the system is to be located.

17. The system of claim 16 further comprising;
   an antenna coupled to the wireless interface module; and
   the wireless interface module communicating wireless signals between the selected wireless transceiver and the antenna.

18. The system of claim 17 further comprising a coaxial cable operable to communicate wireless signals between the selected wireless transceiver and the wireless interface module.

19. The system of claim 16 further comprising an antenna coupled to the wireless transceiver to communicate wireless signals between the wireless network associated with the selected wireless transceiver.

20. The system of claim 16 further comprising:
   the first and second wireless transceivers removably coupled to the wireless interface module;
   the first wireless transceiver providing a primary wide area network interface; and
   the second wireless transceiver providing a local or personal area network interface.

21. The system of claim 16 further comprising:
   a first wireless transceiver disposed within the storage container and a second wireless transceiver disposed within the controller; and
   the first wireless transceiver and the second wireless transceiver operable to communicate information between the storage container and the controller.

22. The system of claim 16 further comprising a local area network (LAN) transceiver disposed within the controller and operable to transmit data concerning the storage container to a handheld device.

23. The system of claim 16 further comprising:
   a wide area network (WAN) transceiver disposed within the controller; and
   the WAN transceiver operable to transmit data between the controller and a network operations center.

24. The system of claim 16 wherein each controller further comprises an addressable switch.

25. The system of claim 16 further comprising the controller operable to unlock a door associated with the service vehicle.

26. The system of claim 16 further comprising a multi-drop bus interface associated with the wireless interface module.

27. The system of claim 16 wherein the multi-drop bus comprises a serial port.

28. The system of claim 27 wherein the serial port comprises a USB port providing an interface for the wireless interface module.

29. The system of claim 27 further comprising the serial port providing an interface for the wireless interface module.

30. The system of claim 16 further comprising an IEEE 802.11 compliant wireless device interfaced with the multi-drop bus.

31. The system of claim 16 further comprising the wireless interface module adapted to accept power from the controller.

32. A system for controlling and monitoring access to a service vehicle and objects disposed within the service vehicle comprising:
- an electronic enclosure disposed within the service vehicle;
- the electronic enclosure operably coupled with a mobile storage container;
- a controller disposed within the electronic enclosure;
- the mobile storage container having a plurality of receptacles operable to be releasably engaged with respective inserts;
- each insert having a respective unique, electronic identifier;
- each receptacle operable to communicate a signal to the controller when one of the inserts is engaged with the receptacle and when the one insert is removed from the receptacle; and
- the controller operable to identify the respective insert disposed in the receptacle.

33. A method for interfacing a controller disposed in a service vehicle with a plurality of wireless networks distributed over a geographic area, the method comprising:
- integrating a wireless interface module with the controller;
- the wireless interface module having a wireless transceiver port capable of interfacing with a plurality of wireless transceivers;
- each wireless transceiver associated with at least one of the plurality of wireless networks;
- deploying the service vehicle to a first geographic location;
- determining one of the plurality of wireless networks as preferred for use at the first geographic location;
- selecting a wireless transceiver associated with the preferred wireless network from the plurality of wireless transceivers; and
- removably coupling the selected wireless transceiver associated with the preferred wireless network at the first geographic location to the wireless transceiver port.

34. The method of claim 33 further comprising:
- relocating the service vehicle to a second geographic location;
- determining one of the plurality of wireless networks as preferred for use at the second geographic location; and
- if the preferred wireless network at the second geographic location is different from the preferred wireless network at the first geographic location, removing the previously selected wireless transceiver removably coupled to the wireless transceiver port and removably coupling a different wireless transceiver associated with the preferred wireless network for the second geographic location to the wireless transceiver port.

35. The method of claim 33 further comprising interfacing a wireless device with a multi-drop bus associated with the wireless interface module.

36. The method of claim 33 further comprising interfacing a BLUETOOTH device with a USB bus associated with the wireless interface module.

37. The method of claim 33 further comprising interfacing a wireless device with an IEEE 802.11 compliant bus associated with the wireless interface module.

38. A service vehicle operable to communicate with a plurality of wireless networks, the service vehicle comprising:
- a controller operable to monitor, control and record operation of the service vehicle and to monitor and record information associated with selected functions of the service vehicle;
- the controller having a bus interface adapted to communicate such information using a wireless interface module;
- the wireless interface module removably coupled into the controller bus interface;
- the wireless interface module in electrical communication with the controller to receive the information;
- the wireless interface module having a wireless transceiver port capable of interfacing with a plurality of wireless transceivers respectively associated with one of the plurality of wireless networks;
- a wireless transceiver removably coupled to the wireless transceiver port, the wireless transceiver operable to communicate information with the associated wireless network; and
- the wireless transceiver selected from a plurality of wireless transceivers based on each geographic location of the service vehicle and increased reliability of communications with the associated wireless network.

39. The service vehicle of claim 38 further comprising:
- an antenna operable to send and receive signals with the wireless network;
- the antenna coupled to the wireless interface module; and
- an antenna cable interfacing the wireless interface module and the wireless transceiver.

40. The service vehicle of claim 38 further comprising:
- first and second wireless transceivers removably coupled to the wireless interface module;
- the first wireless transceiver compatible with a wide area wireless network; and
- the second wireless transceiver compatible with a local area wireless network.

41. A system operable to provide more than one wireless communication path comprising:
- a service vehicle having at least one controller disposed therein;
- a first wireless transceiver associated with a first wireless network;
- a second wireless transceiver associated with a second wireless network and not operable to communicate over the first wireless network;
- a wireless interface module coupled to the controller and capable of being used with the first and second wireless transceivers;
- a selected wireless transceiver removably coupled to the wireless interface module; and
- the selected wireless transceiver selected from the first and second wireless transceivers based on available wireless networks in a geographical location in which the service vehicle is to be located.

42. The system of claim 41 further comprising;
an antenna coupled to the wireless interface module; and
the wireless interface module communicating wireless signals between the selected wireless transceiver and the antenna.

43. The system of claim 41 further comprising a coaxial cable operable to communicate wireless signals between the selected wireless transceiver and the wireless interface module.

44. The system of claim 41 further comprising an antenna coupled to the wireless transceiver to communicate wireless signals between the wireless network associated with the selected wireless transceiver.

45. The system of claim 41 further comprising:
the first and second wireless transceivers removably coupled to the wireless interface module;
the first wireless transceiver providing a primary wide area network interface; and
the second wireless transceiver providing a local or personal area network interface.

46. The system of claim 41 further comprising a multi-drop bus interface associated with the wireless interface module.

47. The system of claim 41 wherein the multi-drop bus comprises a serial port.

48. The system of claim 41 wherein the serial port comprises a USB port providing an interface for the wireless interface module.

49. The system of claim 41 further comprising the serial port providing an interface for the wireless interface module.

50. The system of claim 41 further comprising an IEEE 802.11 compliant wireless device interfaced with the multi-drop bus.

51. The system of claim 41 further comprising the wireless interface module adapted to accept power from the vending controller.

52. A method for interfacing a controller with a plurality of wireless networks distributed over a geographical area, the method comprising:

installing a wireless interface module into a standardized connector of the controller;
supplying data and power to the wireless interface module from the controller;
preparing the data for transmission across a plurality of wireless networks by the wireless interface module;
deploying the controller in a service vehicle to a geographic location;
selecting one of the plurality of wireless networks for testing as a preferred wireless network for the geographic location;
selecting a wireless transceiver associated with the selected wireless network from a plurality of wireless transceivers respectively associated with the plurality of wireless networks;
removably coupling the selected wireless transceiver to a standardized port associated with the wireless interface module to test the compatibility of the geographic location and the selected wireless network; and
removably coupling additional wireless transceivers with the wireless interface module to determine which transceiver and associated wireless network establishes the best performance at the geographic location.

53. A system operable to provide more than one wireless communication path comprising:
a wireless interface module configured to be coupled to a controller and capable of being used with a first and second wireless transceivers; the first wireless transceiver associated with a first wireless network; the second wireless transceiver associated with a second wireless network and not operable to communicate over the first wireless network; a selected wireless transceiver removably coupled to the wireless interface module; and the selected wireless transceiver selected from the first and second wireless transceivers based on available wireless networks in a geographical location in which the controller is to be located.

\* \* \* \* \*